(12) United States Patent
Cho et al.

(10) Patent No.: US 12,478,977 B2
(45) Date of Patent: Nov. 25, 2025

(54) FOOD WASTE DISPOSER

(71) Applicant: SAMSUNG ELECTRONICS CO., LTD., Suwon-si (KR)

(72) Inventors: Hongkwan Cho, Suwon-si (KR); Youngchul Ko, Suwon-si (KR); Dohyun Kim, Suwon-si (KR); Jaewan Hong, Suwon-si (KR); Donghyo Kim, Suwon-si (KR); Kisup Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 294 days.

(21) Appl. No.: 18/237,734

(22) Filed: Aug. 24, 2023

(65) Prior Publication Data
US 2024/0091785 A1 Mar. 21, 2024

Related U.S. Application Data

(63) Continuation of application No. PCT/KR2023/008130, filed on Jun. 13, 2023.

(30) Foreign Application Priority Data

Sep. 20, 2022 (KR) .................. 10-2022-0118928

(51) Int. Cl.
*B02C 18/00* (2006.01)
*B02C 18/12* (2006.01)
(Continued)

(52) U.S. Cl.
CPC .......... *B02C 18/0092* (2013.01); *B02C 18/12* (2013.01); *B02C 18/16* (2013.01); *B02C 23/26* (2013.01); *E03C 1/2665* (2013.01)

(58) Field of Classification Search
CPC ............ B02C 18/0092; B02C 18/0084; B02C 18/2216; B02C 18/12; B02C 18/16;
(Continued)

(56) References Cited

FOREIGN PATENT DOCUMENTS

| KR | 10-2003-0001990 A | 1/2003 |
|---|---|---|
| KR | 10-0444528 B1 | 8/2004 |

(Continued)

OTHER PUBLICATIONS

Translation of KR-100859973.*
(Continued)

*Primary Examiner* — Bobby Yeonjin Kim
(74) *Attorney, Agent, or Firm* — STAAS & HALSEY LLP

(57) ABSTRACT

A food waste disposer including a housing; a grinding device inside the housing to grind food waste; an exhaust fan inside the housing to form an air flow; an exhaust pipe connected to the exhaust fan to form an exhaust flow path along which air from the grinding device flows via the air flow formed by the exhaust fan; a filter assembly to adsorb contaminants from the air flowing along the exhaust flow path; a branch pipe branching from the exhaust pipe between the grinding device and the exhaust fan to form a connection flow path communicating with the exhaust flow path; and a sterilization device connected to the branch pipe to selectively open and close the connection flow path, and, with the connection flow path being open, generate and supply plasma to the exhaust pipe through the connection flow path via an intake airflow formed by the exhaust fan.

15 Claims, 18 Drawing Sheets

(51) Int. Cl.
*B02C 18/16* (2006.01)
*B02C 23/26* (2006.01)
*E03C 1/266* (2006.01)

(58) Field of Classification Search
CPC ......... B02C 18/08; B02C 23/24; B02C 23/26;
B02C 23/28; E03C 1/266; E03C 1/2665
See application file for complete search history.

(56) References Cited

FOREIGN PATENT DOCUMENTS

| | | | | |
|---|---|---|---|---|
| KR | 10-0861002 B1 | 9/2008 | | |
| KR | 100859973 B1 * | 9/2008 | ............. | B02C 18/06 |
| KR | 10-2010-0021169 A | 2/2010 | | |
| KR | 10-0992572 B1 | 11/2010 | | |
| KR | 10-2011-0038220 A | 4/2011 | | |
| KR | 10-1708792 B1 | 2/2017 | | |
| KR | 10-2019-0036108 A | 4/2019 | | |
| KR | 10-2021-0040596 A | 4/2021 | | |
| KR | 10-2260282 B1 | 6/2021 | | |
| WO | WO-2014079135 A1 * | 5/2014 | ............... | B09B 3/65 |

OTHER PUBLICATIONS

Translation of WO-2014079135.*
International Search Report dated Oct. 4, 2023 for International Application No. PCT/KR2023/008130.
Written Opinion of the International Searching Authority dated Oct. 4, 2023 for International Application No. PCT/KR2023/008130.

* cited by examiner

FOOD WASTE DISPOSER

BACKGROUND

1. Field

The disclosure relates to a food waste disposer with an improved structure.

2. Description of the Related Art

A food waste disposer is a device that treats food waste by drying, stirring, and grinding the food waste. The food waste disposer may include a grinding device in which food waste is dried, stirred, and grinded.

In addition, the food waste disposer includes a heating device that applies heat to the grinding device such that the food waste inside the grinding device may be dried.

The grinding device includes a grinding case used as a container in which food waste is heated and grinded, and includes a grinder rotatably provided inside the grinding case.

In order to remove odor generated during the food waste treatment process, the food waste disposer may be provided with a deodorizing device.

Continuous operation of the deodorizing device may cause contaminants to accumulate in an exhaust pipe and a filter of the food waste disposer.

SUMMARY

Aspects of embodiments of the disclosure will be set forth in part in the description which follows and, in part, will be apparent from the description, or may be learned by practice of the presented embodiments.

According to an embodiment of the disclosure, a food waste disposer includes a housing; a grinding device inside the housing to grind food waste; an exhaust fan inside the housing to form an air flow; an exhaust pipe connected to the exhaust fan to form an exhaust flow path along which air introduced from the grinding device flows via the air flow formed by the exhaust fan; a filter assembly to adsorb contaminants from the air flowing along the exhaust flow path; a branch pipe branching from the exhaust pipe between the grinding device and the exhaust fan to form a connection flow path that communicates with the exhaust flow path; and a sterilization device connected to the branch pipe and configured to selectively open and close the connection flow path, and, with the connection flow path being open, generate and supply plasma to the exhaust pipe through the connection flow path via an intake airflow formed by the exhaust fan.

According to an embodiment of the disclosure, the sterilization device may include a case coupled to the branch pipe, a driver coupled to the case and configured to generate power, and an opening and closing member inside the case, connected to the driver, and configured to be movable to open and close the connection flow path.

According to an embodiment of the disclosure, the case may include a branch pipe mounting portion extending toward the branch pipe to be connected to the branch pipe, a plasma generating space formed inside the case, and an outside air inlet configured so that air outside the case is introduced into the case while the outside air inlet is open.

According to an embodiment of the disclosure, the opening and closing member may include a first opening and closing member arranged between the branch pipe mounting portion and the plasma generating space to open and close an end of the branch pipe mounting portion, and a second opening and closing member connected to the first opening and closing member to open and close the outside air inlet.

According to an embodiment of the disclosure, the first opening and closing member may include a guide protrusion extending toward the second opening and closing member, and the second opening and closing member may include a protrusion insertion portion into which the guide protrusion is inserted.

According to an embodiment of the disclosure, the first opening and closing member may be coupled to the driver to be rotatable with respect to the case, and the second opening and closing member may interfere with the guide protrusion so as to move back and forth with respect to the case based on rotational movement of the first opening and closing member.

According to an embodiment of the disclosure, with the opening and closing member in a position opening the connection flow path, air may be introduced into the case from the outside air inlet, and the air introduced into the case may be ionized in the plasma generating space and may be supplied to the branch pipe through the branch pipe mounting portion.

According to an embodiment of the disclosure, the exhaust pipe may include a first exhaust pipe connected to the branch pipe and the exhaust fan to form an upstream portion of the exhaust flow path; and a second exhaust pipe connected to the exhaust fan to form a downstream portion of the exhaust flow path.

According to an embodiment of the disclosure, the food waste disposer may further include a water trap arranged between the second exhaust pipe and the filter assembly and configured to collect condensed water generated from the air flowing along the exhaust flow path.

According to an embodiment of the disclosure, the food waste disposer may further include a controller configured to control the sterilization device, and the controller may be configured to, after a food waste treatment process of the grinding device is completed, control the sterilization device to open the connection flow path to perform a sterilization process of supplying plasma to the exhaust pipe.

According to an embodiment of the disclosure, the food waste disposer may further include a cover device mounted on the housing to open or close an upper surface of the housing, and having a guide duct forming a guide flow path through which the air introduced from the grinding device flows with the cover device being in a position to close the upper surface of the housing and the air flow being formed by the exhaust fan.

According to an embodiment of the disclosure, the food waste disposer may further include an accommodating frame arranged between the housing and the grinding device to cover an outside of the grinding device, and having an exhaust portion in communication with the guide flow path and the exhaust flow path; and a blocking member configured to open and close the exhaust portion.

According to an embodiment of the disclosure, the cover device may further include a connecting duct coupled to a rear end of the guide duct to connect the guide duct and the exhaust portion, and the connecting duct may include a pusher formed to extend and configured to, with the cover device being in the position to close the upper surface of the housing, press the blocking member so as to open the exhaust portion.

According to an embodiment of the disclosure, the exhaust flow path and the connection flow path may be formed in a region behind the grinding device.

According to an embodiment of the disclosure, the food waste disposer may further include a storage device disposed on a front lower side of the grinding device to store food waste treated by the grinding device.

BRIEF DESCRIPTION OF THE DRAWINGS

These and/or other embodiments of the disclosure will become apparent and more readily appreciated from the following description of the embodiments, taken in conjunction with the accompanying drawings of which.

DETAILED DESCRIPTION

Figure 1:
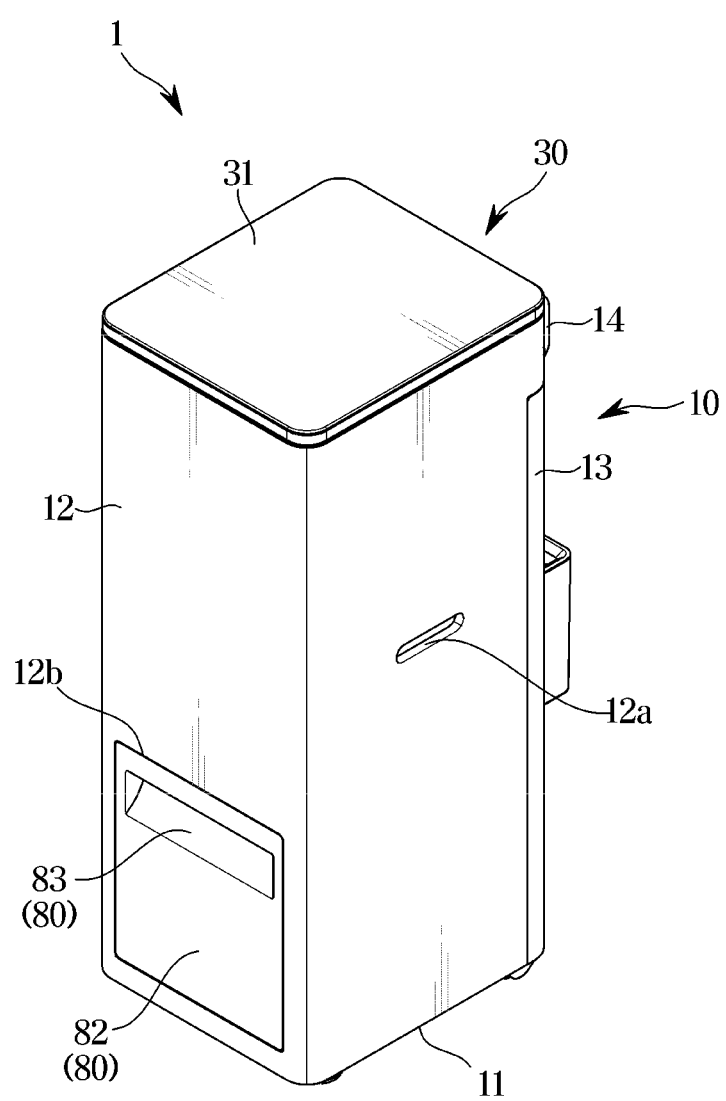
FIG. 1 is a perspective view illustrating a food waste disposer according to an embodiment of the present disclosure, which is viewed from the front.

Embodiments described in the specification and configurations shown in the accompanying drawings may be merely exemplary examples of the present disclosure, and various modifications may replace the embodiments and the drawings of the present disclosure at the time of filing of the present application.

Further, identical symbols or numbers in the drawings of the present disclosure denote components or elements configured to perform substantially identical functions.

Further, terms used herein may be only for the purpose of describing particular embodiments and may be not intended to limit and/or restrict the present disclosure. The singular form may be intended to include the plural form as well, unless the context clearly indicates otherwise. It should be further understood that the terms "include," "including," "have," and/or "having" specify the presence of stated features, integers, steps, operations, elements, components, and/or groups thereof, but do not preclude the presence or addition of one or more other features, integers, steps, operations, elements, components, and/or groups thereof.

Further, it should be understood that, although the terms "first," "second," etc. may be used herein to describe various elements, the elements may be not limited by the terms, and the terms may be only used to distinguish one element from another. For example, a first element could be termed a second element, and similarly, a second element could be termed a first element without departing from the scope of the present disclosure. The term "and/or" includes combinations of one or all of a plurality of associated listed items.

Embodiments of the disclosure provide a food waste disposer having an improved structure to maintain the performance of a deodorizing device for a long time.

Hereinafter, embodiments according to the disclosure will be described in detail with reference to the accompanying drawings.

Figure 2:
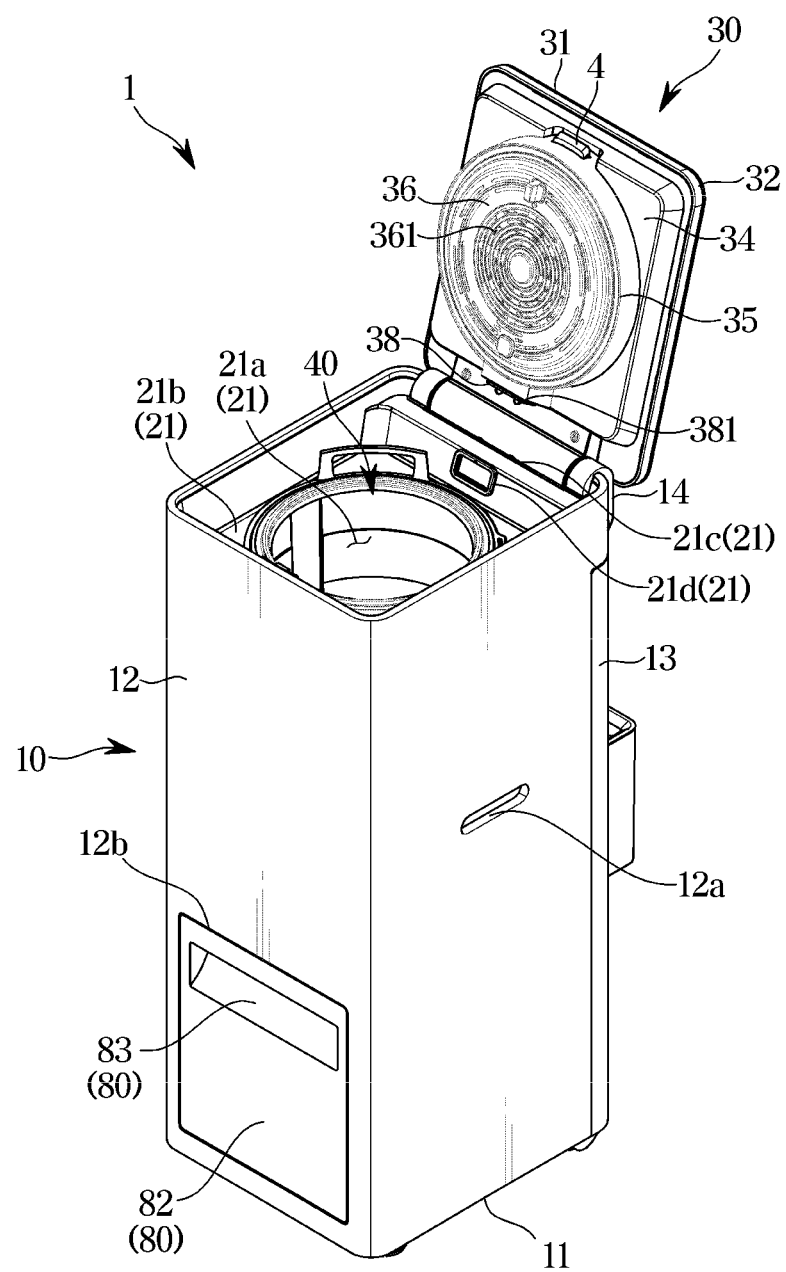
FIG. 2 is a perspective view illustrating a state in which a cover device of a food waste disposer according to an embodiment of the present disclosure is open, which is viewed from the front.
Figure 3:
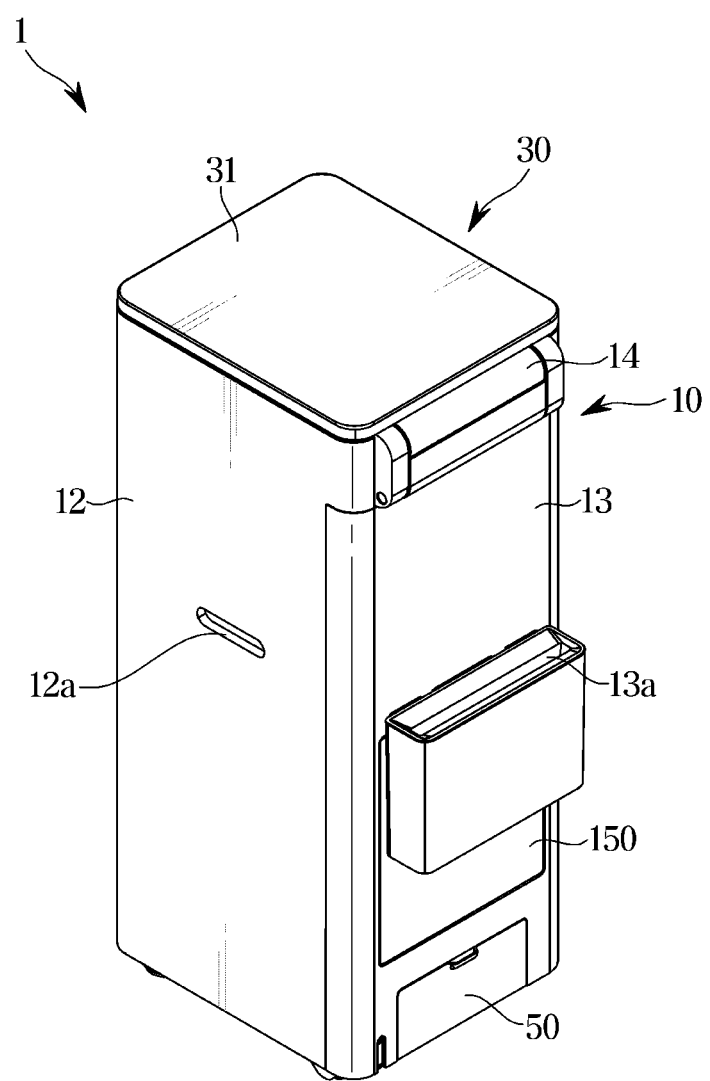
FIG. 3 is a perspective view illustrating a food waste disposer according to an embodiment of the present disclosure, which is viewed from the rear.

FIG. 1 is a perspective view showing illustrating a food waste disposer according to an embodiment of the present disclosure, viewed from the front. FIG. 2 is a perspective view showing illustrating a state in which a cover device of a food waste disposer according to an embodiment of the present disclosure is open, viewed from the front. FIG. 3 is a perspective view illustrating a food waste disposer according to an embodiment of the present disclosure, viewed from the rear.

Referring to FIGS. 1 to 3, the food waste disposer 1 may include a housing 10 and a cover device 30 covering an upper portion of the housing 10.

The housing 10 may form an exterior of the food waste disposer 1. For example, the housing 10 may include a base housing 11, and a first side housing 12 and a second side housing 13 which are arranged above the base housing 11.

The base housing 11 may form a bottom surface 412 of the food waste disposer 1, and the first side housing 12 and the second side housing 13 may form side surfaces of the food waste disposer 1.

The base housing 11, the first side housing 12, and the second side housing 13 may be detachably coupled to each other.

It is illustrated that the first side housing 12 and the second side housing 13 are formed separately in FIGS. 1 to 3, but are not limited thereto. Alternatively, the first side housing 12 and the second side housing 13 may be integrally formed with each other.

A user or an installer may easily access various components arranged inside the food waste disposer 1 by separating the first side housing 12 and the second side housing 13 from the base housing 11.

The first side housing 12 of the food waste disposer 1 may include an accommodating portion 12b and a grip groove 12a.

The accommodating portion 12b may be formed by opening a portion of a front surface of the first side housing 12. The accommodating portion 12b may be provided to receive a storage case 81 of a storage device 80 to be described below. The storage case 81 may be provided to be inserted into or withdrawn from the accommodating portion 12b.

For example, the storage case 81 may slide along the front and rear direction of the food waste disposer 1 and be inserted into or withdrawn from the accommodating portion 12b.

A holding portion 83 provided to be gripped may be formed on an exposed portion 82 of the storage case 81.

The exposed portion 82 of the storage case 81 may form the front surface of the storage case 81. The exposed portion 82 of the storage case 81 may be exposed to the outside of the food waste disposer 1 through the accommodating portion 12b of the first side housing 12.

The holding portion 83 of the storage case 81 may have a shape that is recessed rearward from the front surface of the exposed portion 82 of the storage case 81.

Although not shown in the drawing, the exposed portion 82 of the storage case 81 may include a window. A user may visually check an amount of food waste collected inside the storage case 81 through the window formed of a transparent material.

The grip groove 12a of the first side housing 12 may be formed by cutting a portion of the first side housing 12. A user may move the position of the food waste disposer 1 by holding the food waste disposer 1 through the grip groove 12a.

The food waste disposer 1 may include a housing exhaust portion 13a provided at the rear of the second side housing 13.

The housing exhaust portion 13a may be provided to communicate with a filter discharger portion 153 (refer to FIG. 4) of a filter assembly 150. Accordingly, air filtered inside the filter assembly 150 may be discharged to the outside of the food waste disposer 1 through the filter discharger portion 153 and the housing exhaust portion 13a.

A water trap 50 may be arranged under the filter assembly 150. The water trap 50 may be detachably mounted on the base housing 11. The water trap 50 may be provided to collect condensed water generated in a deodorizing device 100. Details thereof will be described below.

The food waste disposer 1 may include a hinge housing 14. The hinge housing 14 may be provided to connect the housing 10 and the cover device 30. For example, the hinge housing 14 may be connected to the cover device 30 and coupled to the second side housing 13. Accordingly, the cover device 30 may be provided to be rotatable with respect to the housing 10 through the configuration of the hinge housing 14.

The cover device 30 may be configured to open or close an open upper surface of the housing 10. The cover device 30 may be rotatably mounted on the housing 10 to cover the upper portion of the housing 10.

For example, the cover device 30 may be provided to cover the open upper surfaces of the first side housing 12 and the second side housing 13.

The cover device 30 may be mounted on the housing 10 to cover an upper portion of a grinding device 40. The cover device 30 may be provided to transfer air in the grinding device 40 to the deodorizing device 100 in a state in which the housing 10 is closed. Details thereof will be described below.

Figure 4:
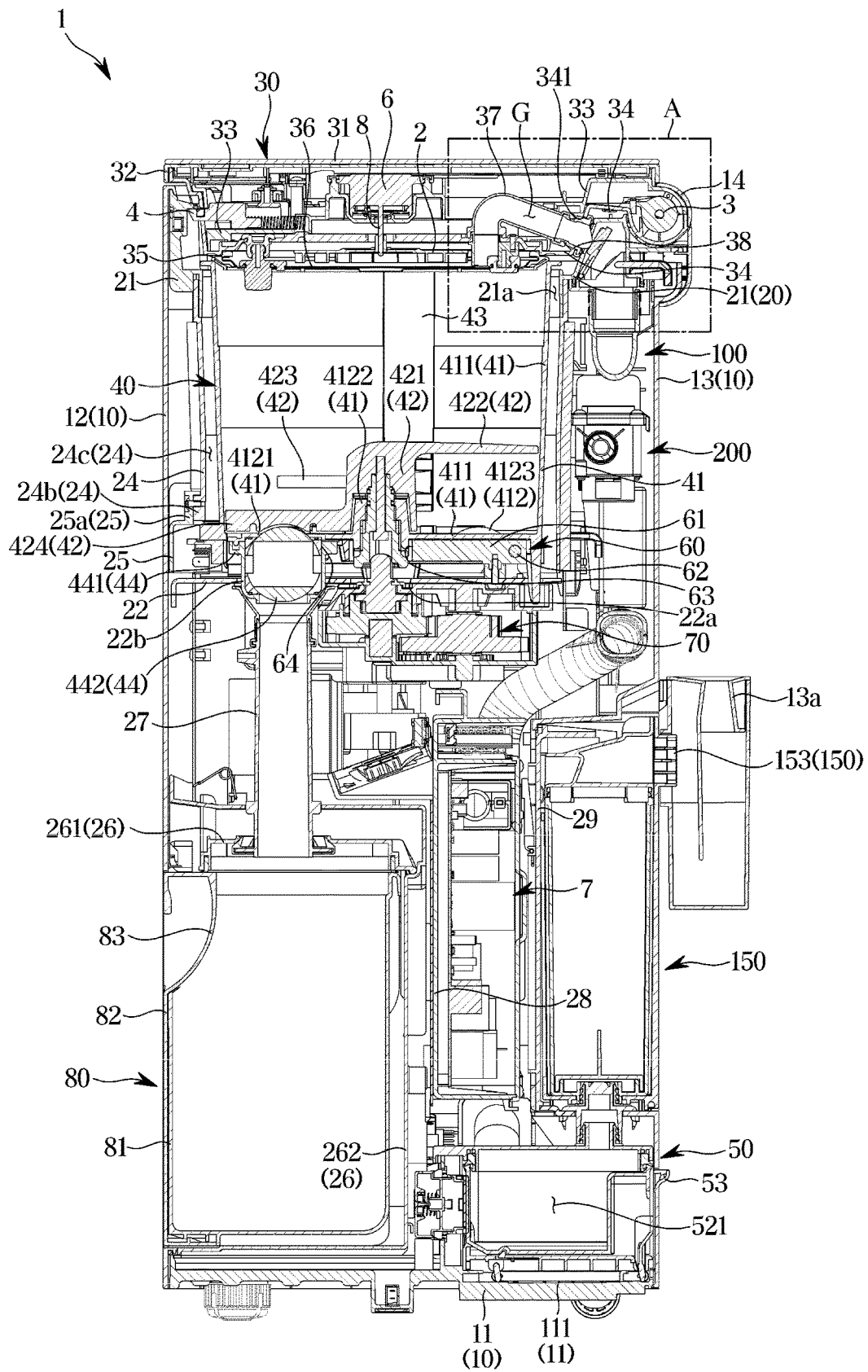
FIG. 4 is a cross-sectional view of a food waste disposer according to an embodiment of the present disclosure.
Figure 5:
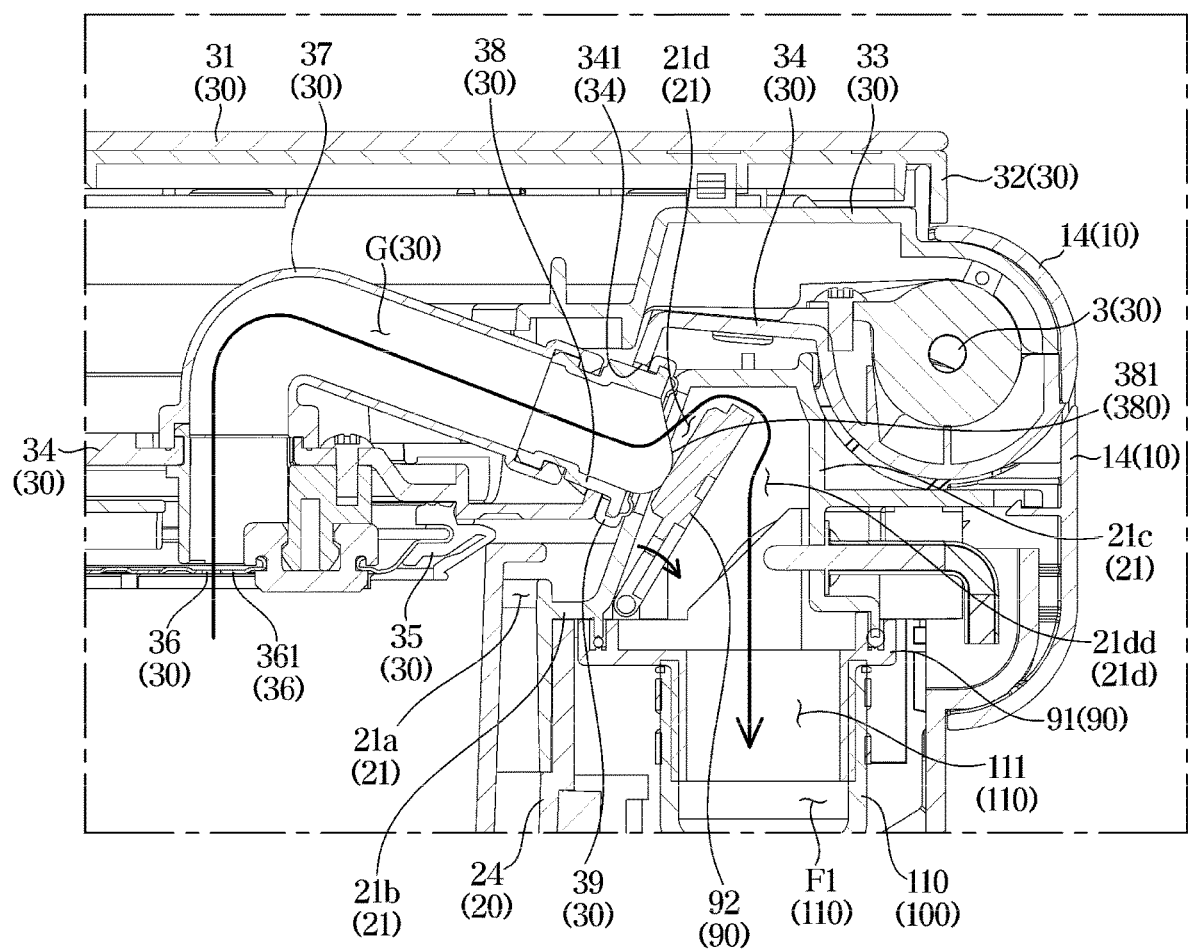
FIG. 5 is an enlarged view of part A of FIG. 4.

FIG. 4 is a cross-sectional view of the food waste disposer according to an embodiment of the disclosure. FIG. 5 is an enlarged view of part A of FIG. 4.

Hereinafter the overall configuration of the food waste disposer 1 according to an embodiment of the disclosure will be described with reference to FIGS. 1 to 5.

Referring to FIGS. 4 and 5, the food waste disposer 1 may include the cover device 30 mounted on the outside of the housing 10 to open or close the upper surface of the grinding device 40, and the grinding device 40 received in the housing 30.

The cover device 30 may include a top plate 31, an upper frame 32, a middle frame 33 and a lower frame 34.

The top plate 31 may form an upper surface of the food waste disposer 1. For example, when the cover device 30 closes the upper portion of the housing 10, the top plate 31 may be provided as the upper surface of the food waste disposer 1. The top plate 31 may form an upper exterior of the food waste disposer 1.

The upper frame 32, the middle frame 33, and the lower frame 34 may be arranged under the top plate 31. The upper frame 32 may be coupled to the middle frame 33. The middle frame 33 may be coupled to the lower frame 34. The middle frame 33 may be arranged between the upper frame 32 and the lower frame 34.

A predetermined accommodation space may be formed between the upper frame 32 and the middle frame 33. A predetermined accommodation space may be formed between the middle frame 33 and the lower frame 34.

For example, the upper frame 32 and the middle frame 33 may be coupled to form a space spaced apart by a predetermined distance in a vertical direction. In addition, the middle frame 33 and the lower frame 34 may be coupled to form a space spaced apart by a predetermined distance in the vertical direction.

The cover device 30 may include a cover frame 36 and a cover gasket 35.

The cover frame 36 may form a lower surface of the cover device 30. The cover frame 36 may be provided in a size that is received in a food waste inlet port arranged in the upper portion of the grinding device 40. The cover frame 36 may include an inlet hole 361 (refer to FIG. 2) through which air flows from the grinding device 40. Air inside the grinding device 40 may flow to a guide duct 37, to be described below, through the inlet hole 361 of the cover frame 36.

The cover frame 36 may be provided in a shape corresponding to the inlet port of the grinding device 40. Referring to FIG. 2, as the inlet port of the grinding device 40 is provided in a circular shape, the cover frame 36 may also be provided in a circular shape. However, the shapes of the cover frame 36 and the inlet port of the grinding device 40 are not limited thereto.

The cover gasket 35 may be arranged to cover an outer rim of the cover frame 36.

The cover gasket 35 may be provided to seal between the cover frame 36 and the inlet port of the grinding device 40. The cover gasket 35 may be provided to be in contact with an upper edge of the grinding device 40.

For example, the cover gasket 35 may be provided to prevent air, which is in the grinding device 40, from leaking out of the cover device 30 in a state in which the cover device 30 closes the upper portion of the housing 10. Accordingly, the cover gasket 35 may prevent a state in which air, which contains contaminants inside the grinding device 40, leaks out of the food waste disposer 1 without passing through the deodorizing device 100.

The cover gasket 35 may be formed of a material having a predetermined elasticity.

The cover device 30 may be provided to be rotatable with respect to the housing 10 based on a cover rotation shaft 3. For example, the cover rotation shaft 3 may be coupled to the hinge housing 14 to allow the cover device 30 to rotatably open or close the top of the housing 10.

However, the operation of the cover device 30 is not limited thereto, and the upper portion of the housing 10 may be opened or closed in a sliding manner without a separate hinge housing 14, or the upper portion of the housing 10 may be opened or closed in a manner completely separated from the housing 10.

The cover device 30 may include a locking member 4.

The locking member 4 may be mounted on the middle frame 33. The locking member 4 may be provided to be elastically movable along the front and rear direction of the food waste disposer 1.

The locking member 4 may be provided to be inserted into an accommodation frame 21 to be described below. Accordingly, the locking member 4 may be provided to maintain a closed state of the cover device 30 when the cover device 30 closes the upper portion of the housing 10.

However, the shape of the locking member 4 is not limited thereto, and the locking member 4 may be provided in a hook shape to temporarily fix the position of the cover device 30.

The cover device 30 may include a circulation fan 2, a fan rotation shaft 8 and a fan driver 6.

The circulation fan 2 may be arranged between the middle frame 33 and the lower frame 34. The fan driver 6 may be arranged between the upper frame 32 and the middle frame 33.

The fan rotation shaft 8 may be provided to transmit power of the fan driver 6 to the circulation fan 2 by connecting the fan driver 6 and the circulation fan 2. The fan rotation shaft 8 may pass through the middle frame 33 and be coupled to the circulation fan 2.

The circulation fan 2 may be provided above the grinding device 40 to allow heat inside a grinding case 41 of the grinding device 40 to be evenly distributed.

For example, as a heating device 60 provided under the grinding device 40 heats the grinding device 40, food waste inside the grinding device 40 may be heated.

In the grinding device 40, food waste adjacent to the heating device 60 is heated more. Therefore, heat may be non-uniformly transferred to the food waste received in the grinding device 40.

Therefore, as the circulation fan 2 is arranged in the cover device 30, heat inside the grinding device 40 may be evenly circulated. In other words, the circulation fan 2 may be provided to induce convection inside the grinding case 41.

Therefore, a temperature inside the grinding case 41 may be almost uniform regardless of its position, and a drying efficiency of the food waste received inside the grinding case 41 may be improved.

The cover device 30 may include the guide duct 37.

The guide duct 37 may be provided to penetrate the lower frame 34. The guide duct 37 may be provided to be rotated together with the cover device 30 as the cover device 30 rotates.

For example, when the cover device 30 closes the upper portion of the housing 10, one end of the guide duct 37 may be arranged to face the inside of the grinding case 41 together with the cover frame 36.

For example, when the cover device 30 closes the upper portion of the housing 10, one end of the guide duct 37 may be provided to face downward.

The guide duct 37 may be mounted inside the cover device 30. One end of the guide duct 37 may be fixed to the lower frame 34. One end of the guide duct 37 may be open toward the cover frame 36. The other end of the guide duct 37 may be coupled to a connecting duct 38 to be described below.

The guide duct 37 may extend in a curved shape. However, the shape of the guide duct 37 is not limited thereto. For example, it is sufficient that the shape of the guide duct 37 is provided to guide the air in the grinding case 41 to an exhaust pipe.

The guide duct 37 may form a guide flow path G into which air of the grinding device 40 is introduced. The guide flow path G may communicate with the grinding device 40. Particularly, as one end of the guide duct 37 is provided to open toward the cover frame 36, the air of the grinding device 40 introduced through the inlet hole 361 of the cover frame 36 may be introduced into the guide duct 37.

The cover device 30 may include the connecting duct 38 and a duct sealing member 39.

The connecting duct 38 may be coupled to the other end of the guide duct 37. For example, the connecting duct 38 may be coupled to a rear end of the guide duct 37. The connecting duct 38 may be coupled to a duct mounting portion 341 of the lower frame 34.

The connecting duct 38 may be provided to connect the guide duct 37 received in the cover device 30 and an exhaust portion 21d formed in the accommodation frame 21. One end of the connecting duct 38 may be connected to the guide duct 37 and the other end of the connecting duct 38 may protrude outward from the cover device 30 through the duct mounting portion 341.

The connecting duct 38 may include a pusher 381. The pusher 381 may protrude outward from the rear of the cover device 30.

The pusher 381 may be provided to press a blocking member 92 provided to maintain the exhaust portion 21d of the accommodation frame 21 in a closed state, which will be described below. Details thereof will be described below.

The duct sealing member 39 may be coupled to the other end of the connecting duct 38. For example, the duct sealing member 39 may be coupled to a portion, which protrudes outward of the cover device 30 through the duct mounting portion 341, in the connecting duct 38.

The duct sealing member 39 may be provided to seal between the connecting duct 38 of the cover device 30 and the exhaust portion 21d of the accommodation frame 21. When the cover device 30 closes the upper portion of the housing 10, the duct sealing member 39 may prevent the air, which flows to the connecting duct 38 through the guide duct 37, from leaking into a gap between the connecting duct 38 and the exhaust portion 21d. Therefore, air containing contaminants may not flow out without passing through the deodorizing device.

The grinding device 40 may be arranged under the cover device 30 so as to be opened or closed by the cover device 30.

The grinding device 40 may include the grinding case 41 in which food waste is disposed of. Disposal of food waste may be used as a term referring to drying, stirring, and grinding of food waste. Alternatively, disposal of food waste may be used as a term referring to one of drying, stirring, or grinding of food waste.

The grinding device 40 may be provided to accommodate food waste. The grinding device 40 may be arranged inside the housing 10 and separated out of the housing 10. The grinding device 40 may include a handle 413. A user may separate the grinding device 40 from the inside of the housing 10 to the outside by gripping the handle 413.

The grinding case 41 may include an open upper surface so as to form an inlet port. A user may insert food waste into the grinding device 40 through the inlet port of the grinding case 41.

The inlet port of the grinding case 41 may be closed by the cover frame 36 of the cover device 30. The cover gasket 35 of the cover device 30 may be provided to seal a gap between the inlet port of the grinding case 41 and the cover frame 36.

The grinding case 41 may include a sidewall 411 and a bottom surface 412.

A fixed grinder 43 may be mounted on the sidewall 411 of the grinding case 41. On the bottom surface 412 of the grinding case 41, a rotary grinder 42 may be connected to a first driving device 72 so as to be rotatable.

The rotary grinder 42 and the fixed grinder 43 may be provided to grind food waste through interaction with each other.

The rotary grinder 42 may include a rotary body 421 to which a grinder shaft 71 of the first driving device 72 is coupled. The rotary grinder 42 may include a first grinder 422, a second grinder 423, and a third grinder 424 that extend radially from the rotary body 421. The first grinder 422, the second grinder 423, and the third grinder 424 may be arranged at different heights to stir and grind food waste.

It is illustrated that the rotary grinder 42 includes the first grinder 422 to the third grinder 424 in FIG. 4, but the number of grinders is not limited thereto.

A transfer portion 4121 may be formed on the bottom surface 412 of the grinding case 41. The transfer portion 4121 may be formed by cutting a portion of the bottom surface 412 of the grinding case 41. Food waste that is disposed of inside the grinding case 41 may be transported to the storage device 80 through the transfer portion 4121.

A rotation shaft accommodating portion 4122 may be formed on the bottom surface 412 of the grinding case 41. The rotation shaft accommodating portion 4122 may be formed to extend upward from the center of the grinding case 41. The grinder shaft 71 of the first driving device 72 may be inserted into the rotation shaft accommodating portion 4122 to transmit power to the rotating body 421 of the rotary grinder 42.

The grinding device 40 may include a valve assembly 44. The valve assembly 44 may include a valve case 441 and a ball valve 442.

The valve case 441 may be coupled to a lower portion of the grinding case 41. The valve case 441 may be coupled to the grinding case 41 at a position communicating with the transfer portion 4121 of the grinding case 41.

The valve case 441 may be provided to accommodate the ball valve 442 therein. Particularly, the valve case 441 may cover the outside of the ball valve 442 to allow the ball valve 442 to be rotated therein.

The ball valve 442 may be rotated inside the valve case 441. The ball valve 442 may be rotated so as to open and close the transfer portion 4121 of the grinding case 41.

The ball valve 442 may pass through the transfer portion 4121 of the grinding case 41 and protrude upward from the bottom surface 412 of the grinding case 41. Accordingly, a lower surface of the third grinder 424 of the rotary grinder 42 may be recessed inward to correspond to the protruding shape of the ball valve 442. Accordingly, the third grinder 424 may be provided to avoid interference with the ball valve 442.

In addition, due to the shape of the third grinder 424, a protrusion 4123 may be formed on the bottom surface 412 of the grinding case 41.

The protrusion 4123 may be provided to protrude upward from the bottom surface 412.

As the protrusion 4123 corresponding to the recessed shape of the third grinder 424 is formed on the bottom surface 412 of the grinding case 41, the third grinder 424 may transfer all the food waste accumulated in the food waste to the transfer portion 4121 and effectively stir the food waste.

The ball valve 442 may be provided in a ball shape in which a part of an inner portion thereof is opened.

The ball valve 442 of the valve assembly 44 may be rotated by receiving a driving force from the driving devices. For example, the ball valve 442 may be provided to open or close the transfer portion 4121 of the grinding case 41 through rotation by receiving the driving force from a second driving device 73.

In addition, when the ball valve 442 is rotated in a state in which the transfer portion 4121 is opened, the second driving device 73 may interfere with the upward movement of the ball valve 442 so as to prevent the ball valve 442 from being separated from the second driving device 73.

Accordingly, it is possible to prevent food waste from leaking out when a user separates the grinding device 40 without recognizing the open state of the transfer portion 4121.

The food waste disposer 1 may include the heating device 60.

The heating device 60 may include a heating frame 61 and a heating wire 62 accommodated inside the heating frame 61.

The heating frame 61 may be arranged to be in contact with the lower portion of the grinding device 40. The bottom surface 412 of the grinding device 40 may be heated by the heating wire 62 accommodated inside the heating frame 61.

The food waste disposer 1 may include the driving device 70.

The driving device 70 may be arranged below the heating device 60.

Figure 6:
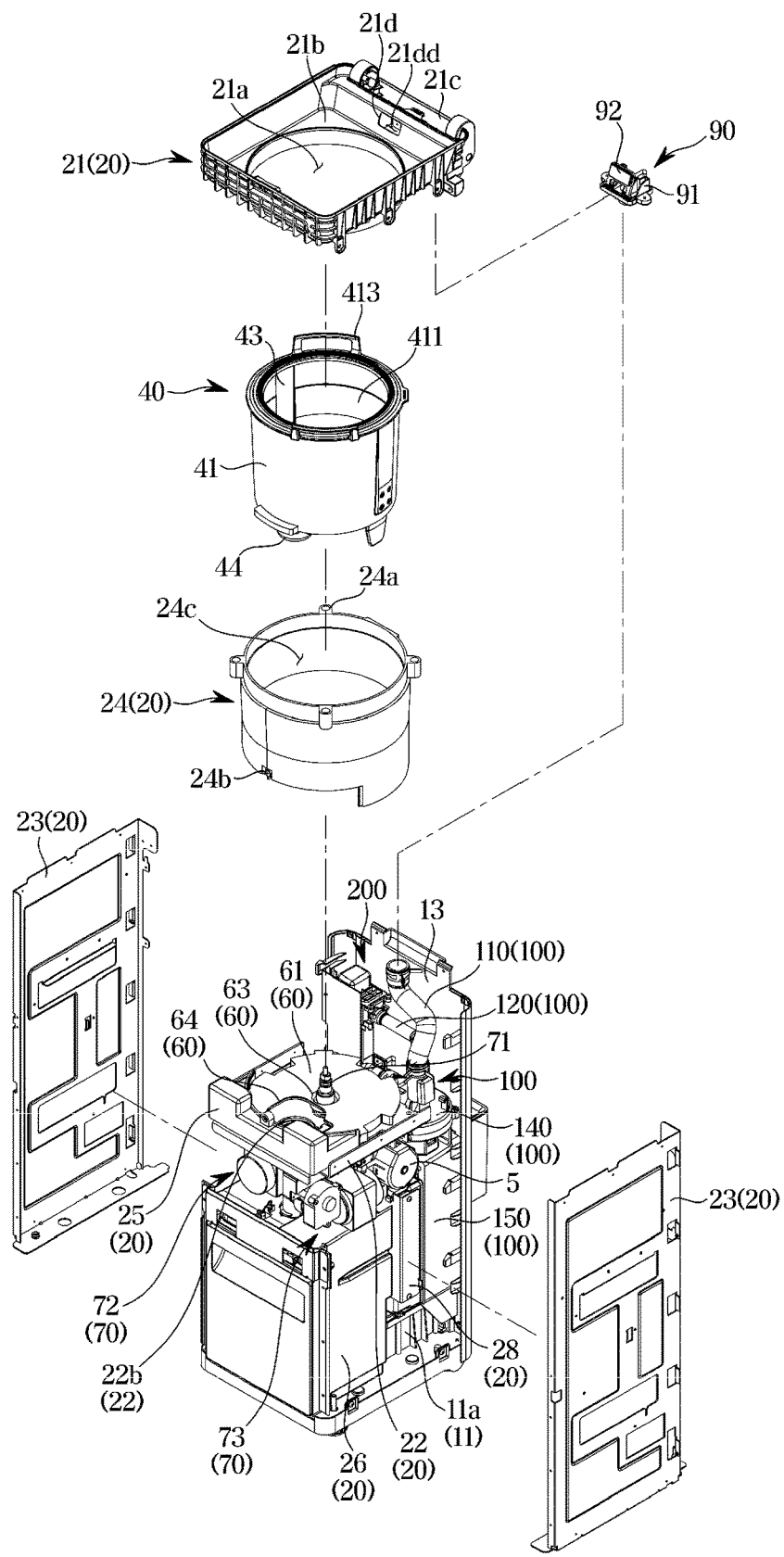
FIG. 6 is an exploded view illustrating some components of a food waste disposer according to an embodiment of the present disclosure, viewed from the front.

The driving device 70 may include the first driving device 72 (refer to FIG. 6) and the second driving device 73 (refer to FIG. 6). The first driving device 72 may transmit a driving force to the rotary grinder 42 of the grinding device 40, and the second driving device 73 may transmit a driving force to the valve assembly 44 of the grinding device 40.

The food waste disposer 1 may include the storage device 80.

The storage device 80 may be arranged inside the storage frame. The storage device 80 may be connected to a transfer duct 27. An upper end of the transfer duct 27 may be connected to the valve assembly 44 and a lower end of the transfer duct 27 may be connected to the storage device 80.

Food waste processed by the grinding device 40 may be transferred to the transfer duct 27 as the valve assembly 44 opens the transfer portion 4121. Food waste transported through the transfer duct 27 may be stored in the storage device 80.

The storage device 80 may be arranged on the front lower side of the grinding device 40 to store food waste processed by the grinding device 40.

The storage device 80 may include the storage case 81 and the exposed portion 82 coupled to the storage case 81 and exposed to the outside of the food waste disposer 1. The holding portion 83 may be formed at an upper end of the exposed portion 82. Accordingly, a user may empty the food waste collected in the storage device 80 from the storage device 80 by holding the holding portion 83 and separating the storage device 80 from the housing 10.

The food waste disposer 1 may include an electrical component chamber 7. Electrical components such as various circuit boards may be arranged in the electrical component chamber 7.

The food waste disposer 1 may include a controller. The controller may control various components of the food waste disposer 1. Accordingly, the controller may control the operation of the food waste disposer 1 based on an electronic signal generated by the electrical component chamber 7.

The food waste disposer 1 may include an exhaust portion opening and closing device 90.

The exhaust portion opening and closing device 90 may include a frame coupling body 91 and the blocking member 92. The blocking member 92 may be provided to open or close the exhaust portion 21d of the accommodation frame 21. The blocking member 92 may be positioned to close the exhaust portion 21d when the cover device 30 opens the top of the housing 10.

The frame coupling body 91 may be connected to an end of a first exhaust pipe 110 to be described below. The frame coupling body 91 may be coupled to a lower portion of the accommodation frame 21.

The frame coupling body 91 may be provided to connect the accommodation frame 21 and the first exhaust pipe 110. The frame coupling body 91 may form a communication space 21dd therein. The communication space 21dd may be provided to communicate with the guide flow path G of the guide duct 37. The communication space 21dd may be provided to communicate with a first exhaust flow path F1 of the first exhaust pipe 110.

The exhaust flow path F1 along which air introduced from the grinding device 40 flows via the air flow formed by the exhaust fan 140.

The blocking member 92 may be elastically supported by the frame coupling body 91. The blocking member 92 may be coupled to the frame coupling body 91 to maintain a state in which the exhaust portion 21d of the accommodation frame 21 is closed. The blocking member 92 may be movably arranged inside the communication space 21dd.

The food waste disposer 1 may include the deodorizing device 100 and a sterilization device 200.

The deodorizing device 100 may be connected to the cover device 30. The deodorizing device 100 may include the first exhaust pipe 110 connected to the cover device 30.

The first exhaust pipe 110 may include a first inlet 111 connected to the communication space 21dd of the frame coupling body 91. The first exhaust pipe 110 may form the first exhaust flow path F1 through which air of the grinding device 40 flows.

The deodorizing device 100 may be arranged in a rear portion of the food waste disposer 1 and may be provided to suction air from the grinding device 40, filter the air, and then discharge the filtered air to the outside. Details regarding the deodorizing device 100 will be described below.

The sterilization device 200 may be disposed at one side of the deodorizing device 100 and provided to sterilize the deodorizing device 100. The sterilization device 200 may generate plasma to sterilize the exhaust pipe, the exhaust fan 140, and the filter assembly 150 of the deodorizing device 100 while regenerating the filter.

Details of the deodorizing device 100 and the sterilization device 200 will be described below.

The food waste disposer 1 may include the water trap 50.

The water trap 50 may be arranged on the base housing 11 to collect condensed water generated in the exhaust flow path of the deodorizing device 100.

For example, the water trap 50 may be mounted on a water trap mounting portion 11a of the base housing 11. The water trap 50 may form a condensate collecting space 521 therein. The water trap 50 may be arranged below the filter assembly 150 and connected to the filter assembly 150. Details regarding the water trap 50 will be described below.

A flow of air in a state in which the upper portion of the housing 10 is closed by the cover device 30 will be described with reference to FIG. 5.

As shown in FIG. 5, when the cover device 30 closes the upper portion of the housing 10, the pusher 381 formed on the connecting duct 38 may press the blocking member 92 arranged inside the accommodation frame 21.

For example, the pusher 381 may pass through the exhaust portion 21d of the accommodation frame 21 and press the blocking member 92. As the blocking member 92 is pressed and rotated toward the communication space 21dd, the blocking member 92 may open the exhaust portion 21d of the accommodation frame 21.

As the blocking member 92 opens the exhaust portion 21d of the accommodation frame 21, the inside of the connecting duct 38 and the communication space 21dd may be connected to each other to allow air to flow therebetween. In addition, the communication space 21dd is provided to communicate with the first inlet 111 of the first exhaust pipe 110, and thus the pusher 381 may open the first inlet 111 of the first exhaust pipe 110 by pressing the blocking member 92.

That is, when the cover device 30 closes the upper portion of the housing 10, the blocking member 92 may be elastically moved to a position for opening the exhaust portion 21d.

Therefore, air inside the grinding device 40 may flow into the cover device 30 through the inlet hole 361 of the cover frame 36 of the cover device 30. Air passing through the inlet hole 361 may flow to the guide duct 37 of the cover device 30. In other words, the air of the grinding device 40 may flow along the guide flow path G.

Thereafter, the air passing through the guide duct 37 and the connecting duct 38 may flow into the communication space 21dd through the open exhaust portion 21d of the accommodation frame 21.

The air flowing into the communication space 21dd may flow along the first exhaust flow path F1 through the first inlet 111 of the first exhaust pipe 110. Such an air flow may be formed by the exhaust fan 140 to be described below.

Figure 7:
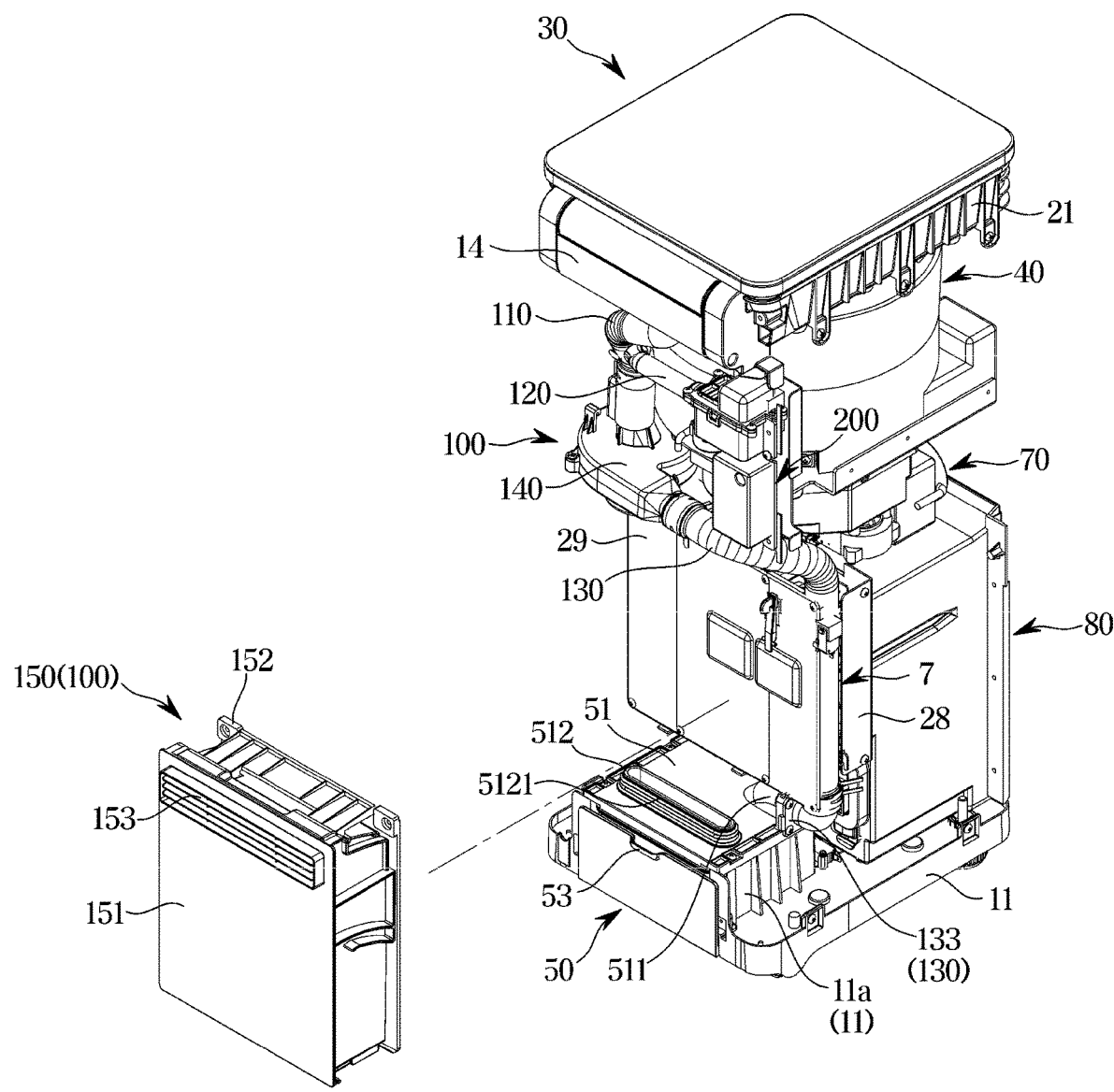
FIG. 7 is an exploded perspective view illustrating some components of a food waste disposer according to an embodiment of the present disclosure, which is viewed from the rear.

FIG. 6 is a front-exploded view illustrating some components of the food waste disposer according to an embodiment of the disclosure. FIG. 7 is a rear-exploded view illustrating some components of the food waste disposer according to an embodiment of the disclosure.

The food waste disposer 1 may include a plurality of inner frames 20. In FIG. 6, the cover device 30 and the first side housing 12 are omitted for convenience of description.

Hereinafter the detailed structure of the inner frame 20 of the food waste disposer 1 and arrangement of various devices will be described.

Referring to FIGS. 6 and 7, the food waste disposer 1 may include the accommodation frame 21.

The accommodation frame 21 may include a base portion 21b, a hinge mounting portion 21c, the exhaust portion 21d, and an opening portion 21a.

The accommodation frame 21 may be arranged between the housing 10 and the grinding device 40 to cover the outside of the grinding device 40. For example, the base portion 21b of the accommodation frame 21 may be arranged between the housing 10 and the grinding device 40 to cover the outside of the grinding device 40.

The hinge mounting portion 21c may be formed at the rear of the base portion 21b. The hinge housing 14 may be coupled to the hinge mounting portion 21c of the accommodation frame 21. The cover device 30 may be provided to be rotated by being coupled to the hinge mounting portion 21c of the accommodation frame 21.

The exhaust portion 21d may be formed behind the base portion 21b. The exhaust portion 21b may be provided to connect the guide flow path G of the cover device 30 and the exhaust flow path of the deodorizing device 100.

The exhaust portion 21d may communicate with the guide flow path G and the exhaust flow path. The exhaust portion 21d may be formed by cutting an inner portion of the base portion 21b.

The accommodation frame 21 may include the communication space 21dd connected to the exhaust portion 21d. The communication space 21dd may be formed in the rear portion of the accommodation frame 21. The exhaust portion opening and closing device 90 may be accommodated in the communication space 21dd.

The opening portion 21a may be provided to be opened inside the base portion 21b. Through the opening portion 21a, the grinding device 40 may be separated out of the accommodation frame 21. The opening portion 21a may be provided to communicate with the inlet port of the grinding device 40.

The food waste disposer 1 may include a support frame 22, a case frame 24, and a fixing frame 25.

The support frame 22 may be arranged below the heating device 60 to support the heating device 60 and the grinding device 40. The fixing frame 25 may be arranged in front of the support frame 22. The fixing frame 25 may include a frame fixer 25a coupled to the case frame 24.

The case frame 24 may be provided to accommodate the grinding device 40. The case frame 24 may be provided in a shape corresponding to the grinding device 40. For example, the case frame 24 may be provided in a substantially cylindrical shape with open upper and lower surfaces.

The case frame 24 may include a grinding device accommodation space 24c. In the grinding device accommodation space 24c, the grinding device 40 may be arranged spaced apart from the case frame 24 by a predetermined distance.

The case frame 24 may include a case fixer 24b. The case fixer 24b may be coupled to the frame fixer 25a of the fixing frame 25. Accordingly, the case frame 24 may be fixed relative to the fixing frame 25.

The case frame 24 may include a frame coupler 24a. The case frame 24 may be coupled to the lower portion of the accommodation frame 21 by the frame coupler 24a. Accordingly, the case frame 24 may be fixed relative to the accommodation frame 21.

The food waste disposer 1 may include a side frame 23. The side frame 23 may be provided as a pair.

A pair of side frames 23 may be arranged to face each other. The side frames 23 may be coupled to both sides of the accommodation frame 21. The side frame 23 may be coupled to the second side housing 13.

The side frame 23 may be arranged on the left and right side of the food waste disposer 1 to cover the grinding device 40, the heating device 60, the driving device 70, the storage device 80, and the deodorizing device 100.

Referring to FIGS. 4 and 6, the food waste disposer 1 may include a storage frame. The storage frame may include a first storage frame 261 and a second storage frame 262. However, the first storage frame 261 and the second storage frame 262 may be formed integrally with each other.

The storage frame may form a space in which the storage device 80 is accommodated. The storage frame may be connected to the transfer duct 27.

The storage frame may be provided to prevent food waste from affecting other components inside the food waste disposer 1 in an accident in which food waste is transferred through the transfer duct 27 in a state in which the storage device 80 is not accommodated in the housing 10, or an accident in which food waste is leaked from the storage device 80 when a user withdraws the storage device 80.

The food waste disposer 1 may include a first partition plate 28 arranged behind the storage device 80 to define the electrical component chamber 7.

The driving device 70 of the food waste disposer 1 may include the first driving device 72 and the second driving device 73.

The first driving device 72 may include the grinder shaft 71 extending upward by penetrating the center of the heating device 60 so as to supply power to the rotary grinder 42.

The second driving device 73 may be configured to supply power to the valve assembly 44. The first driving device 72 and the second driving device 73 may be respectively controlled by the controller.

The heating device 60 may include a first shaft through-hole 63 and a first valve through-hole 64. The support frame 22 may include a second shaft through-hole 22a and a second valve through-hole 22b.

The first shaft through-hole 63 and the second shaft through-hole 22a may be formed side by side in the vertical direction. The first valve through-hole 64 and the second valve through-hole 22b may be formed side by side in the vertical direction.

The grinder shaft 71 of the first driving device 72 may be provided to pass through the first shaft through-hole 63 and the second shaft through-hole 22a. Accordingly, the first driving device 72 may pass through the support frame 22 and the heating device 60, thereby transmitting the driving force to the grinding device 40.

As the valve assembly 44 of the grinding device 40 is formed to protrude downward from the grinding case 41, the valve assembly 44 may protrude to a lower side of the heating device 60 and the support frame 22 by passing through the first valve through-hole 64 and the second valve through-hole 22b.

The valve assembly 44 protruding to the lower side of the heating device 60 and the support frame 22 may be driven by the second driving device 73.

The ball valve 442 of the valve assembly 44 may be rotated by the second driving device 73 so as to open or close the transfer portion 4121 of the grinding case 41.

The food waste disposer 1 may include a cooling fan 5. The cooling fan 5 may be arranged below the heating device 60. The cooling fan 5 may be configured to circulate air inside the housing 10 to allow heat inside the housing 10 to be discharged to the outside. The cooling fan 5 may be arranged on one side of the driving device 70. The cooling fan 5 may be arranged in front of the exhaust fan 140.

The deodorizing device 100 may be arranged in a region behind the grinding device 40. The deodorizing device 100 may be arranged inside the second side housing 13. The sterilization device 200 may be connected to the deodorizing device 100 by a branch pipe 120 and disposed in a region behind the grinding device 40.

Referring to FIGS. 6 and 7, the deodorizing device 100 may include the first exhaust pipe 110, the exhaust fan 140, a second exhaust pipe 130, and the filter assembly 150.

The exhaust fan 140 may be arranged inside the housing 10 to form the air flow. The exhaust fan 140 may be arranged at the rear of the housing 10. The exhaust fan 140 may be provided to suction air from the grinding device 40. The first exhaust pipe 110 and the second exhaust pipe 130 may be connected to the exhaust fan 140.

The first exhaust pipe 110 may be connected to the exhaust fan 140 at an upstream side of the exhaust fan 140, and the second exhaust pipe 130 may be connected to the exhaust fan 140 at a downstream side of the exhaust fan 140. The first exhaust pipe 110 may be connected to the exhaust fan 140 to form the first exhaust flow path F1 (refer to FIG. 8) communicating with the guide flow path G.

Figure 8:
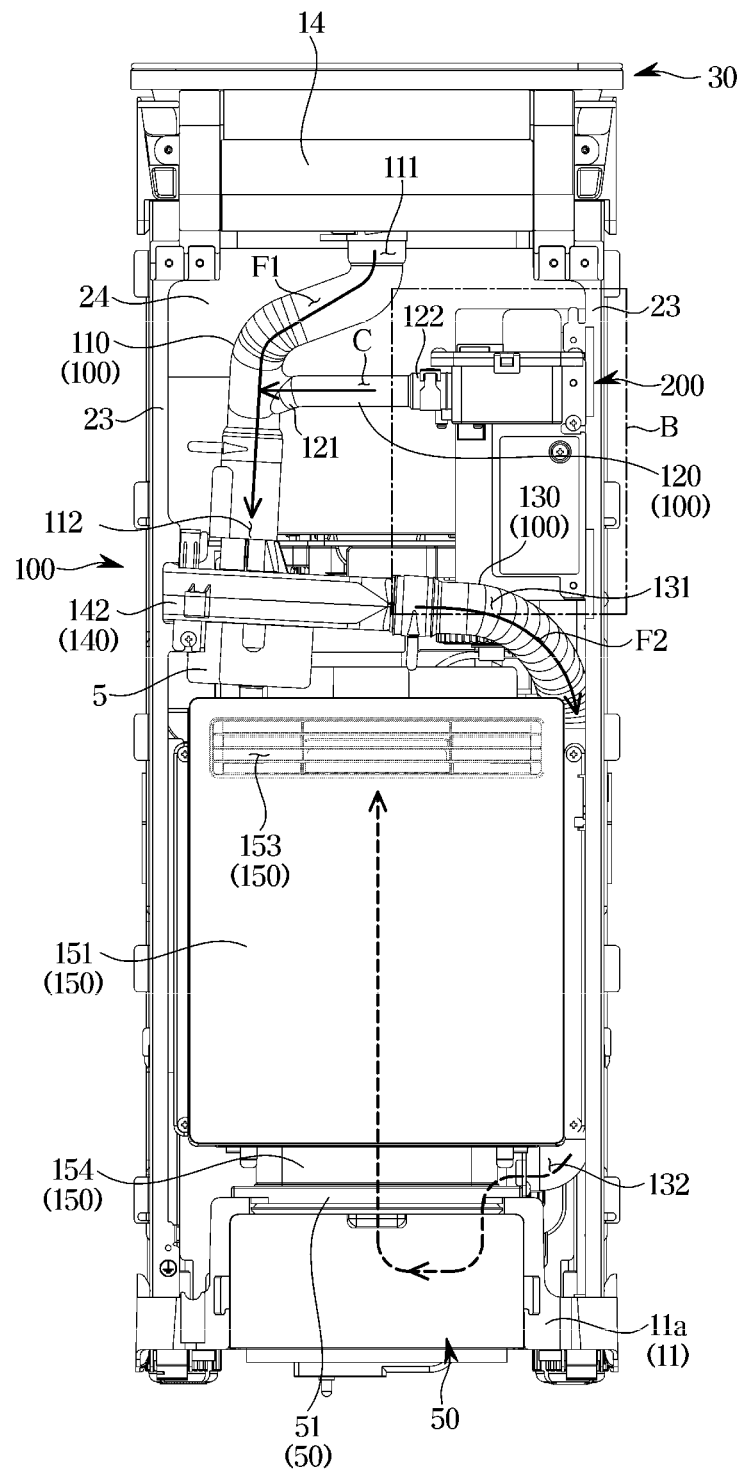
FIG. 8 is a view illustrating an air flow path during a sterilization operation of a food waste disposer according to an embodiment of the present disclosure, which is viewed from the rear.

The first exhaust pipe 110 may form the first exhaust flow path F1 (refer to FIG. 8). The second exhaust pipe 130 may form a second exhaust flow path F2 (refer to FIG. 8). The first exhaust flow path F1 and the second exhaust flow path F2 may be collectively referred to as an exhaust flow path.

The first exhaust pipe 110 and the second exhaust pipe 130 may be provided to allow air, which is introduced from the grinding device 40 by the exhaust fan 140, to flow.

The filter assembly 150 may be provided to adsorb contaminants from air flowing along the first exhaust pipe 110 and the second exhaust pipe 130. A filter provided to filter out contaminants in the air may be arranged inside the filter assembly 150.

The filter assembly 150 may be connected to the exhaust flow path through the exhaust pipe to adsorb contaminants from air flowing along the first exhaust flow path F1 and the second exhaust flow path F2.

Air introduced from the grinding device 40 into the first exhaust pipe 110 and the second exhaust pipe 130 may flow along the exhaust flow path. The filter assembly 150 may be connected to the exhaust flow path. Particularly, the filter assembly 150 may be connected to the exhaust flow path through the first exhaust pipe 110 and the second exhaust pipe 130.

The water trap 50 may be connected to the filter assembly 150 and the second exhaust pipe 130. Accordingly, the air flowing inside the second exhaust pipe 130 may pass through the inside of the water trap 50 and flow to the filter assembly 150.

The water trap 50 may be mounted on the water trap mounting portion 11a of the base housing 11. The water trap 50 may include a cover panel 51.

The cover panel 51 may form an upper surface of the water trap 50. The cover panel 51 may include an exhaust pipe connector 511 connected to the second exhaust pipe 130. For example, the exhaust pipe connector 511 of the cover panel 51 may be coupled to a coupling flange 133 of the second exhaust pipe 130.

The cover panel 51 may include a filter mounting portion 512. The filter mounting portion 512 may extend to an upper side of the cover panel 51 and be connected to the lower portion of the filter assembly 150. The filter mounting portion 512 may form a path through which air flowing into the water trap 50 through the second exhaust pipe 130 flows to the filter assembly 150.

The water trap 50 may include a filter sealing member 5121 coupled to the filter mounting portion 512. The filter sealing member 5121 may be provided to seal a gap between the water trap 50 and the filter assembly 150.

The water trap 50 may include a water trap grip portion 53. The water trap grip portion 53 may be exposed to the outside of the second side housing 13 of the food waste disposer 1. A user may remove the collected condensed water by separating the water trap 50 from the housing 10 by gripping the water trap grip portion 53.

The filter assembly 150 may include a filter case 151 in which the filter is accommodated. The filter case 151 may be coupled to a filter mounting plate 152. The filter mounting plate 152 may be coupled to a second partition plate 29 that defines the electrical component chamber 7 from the rear.

The filter discharge portion 153 may be formed behind the filter case 151. The air flowing through the first exhaust pipe 110 and the second exhaust pipe 130 may pass through the inside of the water trap 50 and flow to the filter assembly 150, and then contaminants may be removed by the filter assembly 150. The air from which contaminants are removed may be discharged to the outside of the food waste disposer 1 through the filter discharge portion 153.

The deodorizing device 100 may include a branch pipe 120.

The branch pipe 120 may branch from the exhaust pipe between the grinding device 40 and the exhaust fan 140 to form a connection flow path C (refer to FIG. 8) communicating with the exhaust flow path. For example, the branch pipe 120 may branch from the first exhaust pipe 110 and be connected to the sterilization device 200.

For example, the branch pipe 120 may branch from the first exhaust pipe 110 at an upstream side of the exhaust fan 140 to form a connection flow path C communicating with the first exhaust flow path F1.

The sterilization device 200 may selectively generate plasma and supply the plasma to the exhaust pipe through a suction airflow formed by the exhaust fan 140. The sterilization device 200 may be connected to the branch pipe 120 to open or close the connection flow path C. The sterilization device 200 may be disposed on one side of a rear portion of the grinding device 40.

With the connection flow path C being open, generate and supply plasma to the exhaust pipe 110, 130 through the connection flow path C via an intake airflow formed by the exhaust fan 140.

Details of the sterilization device 200 will be described below.

Figure 9:
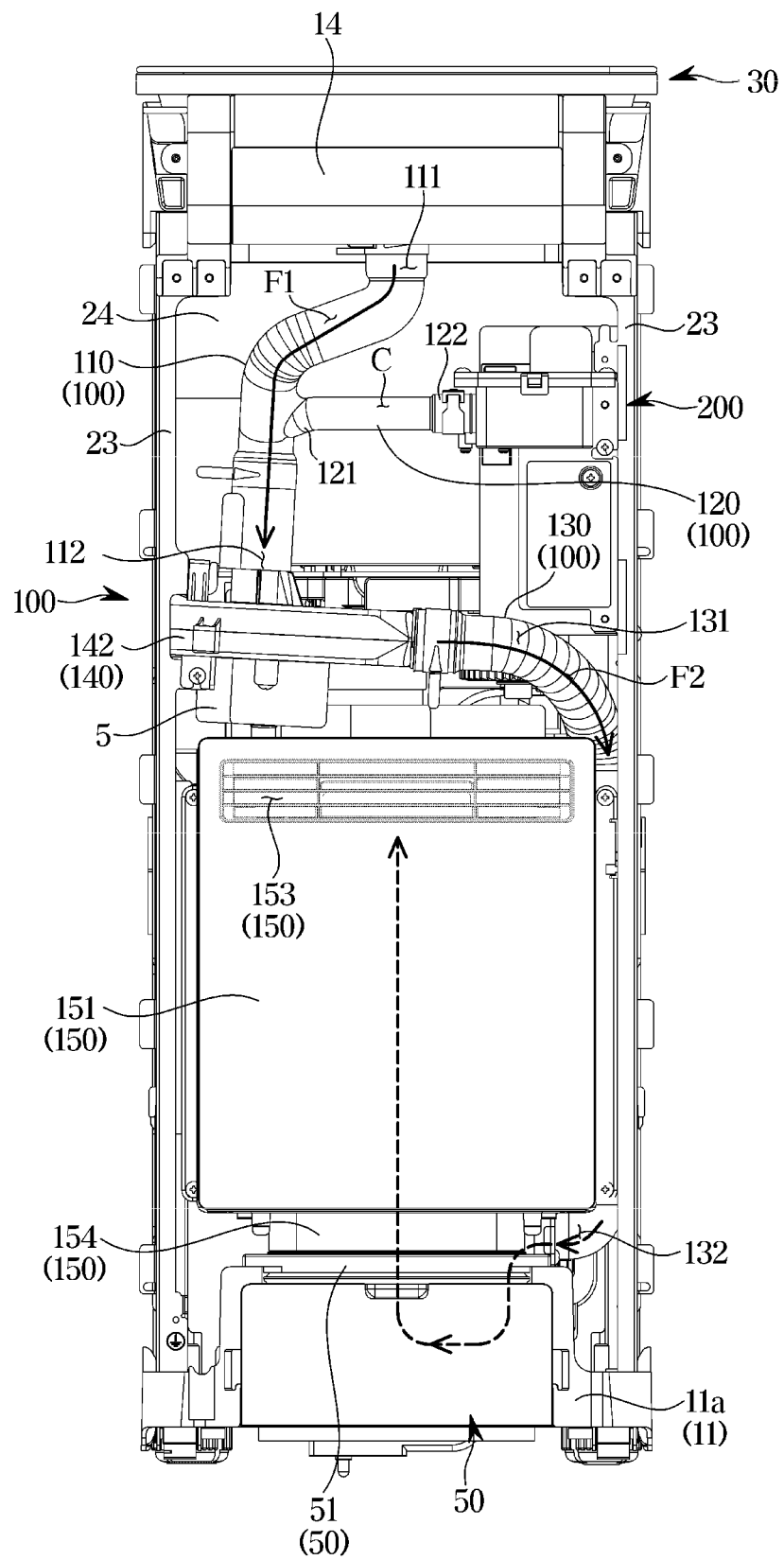
FIG. 9 is a rear view illustrating an air flow path during a food waste treatment operation of a food waste disposer according to an embodiment of the present disclosure.
Figure 10:
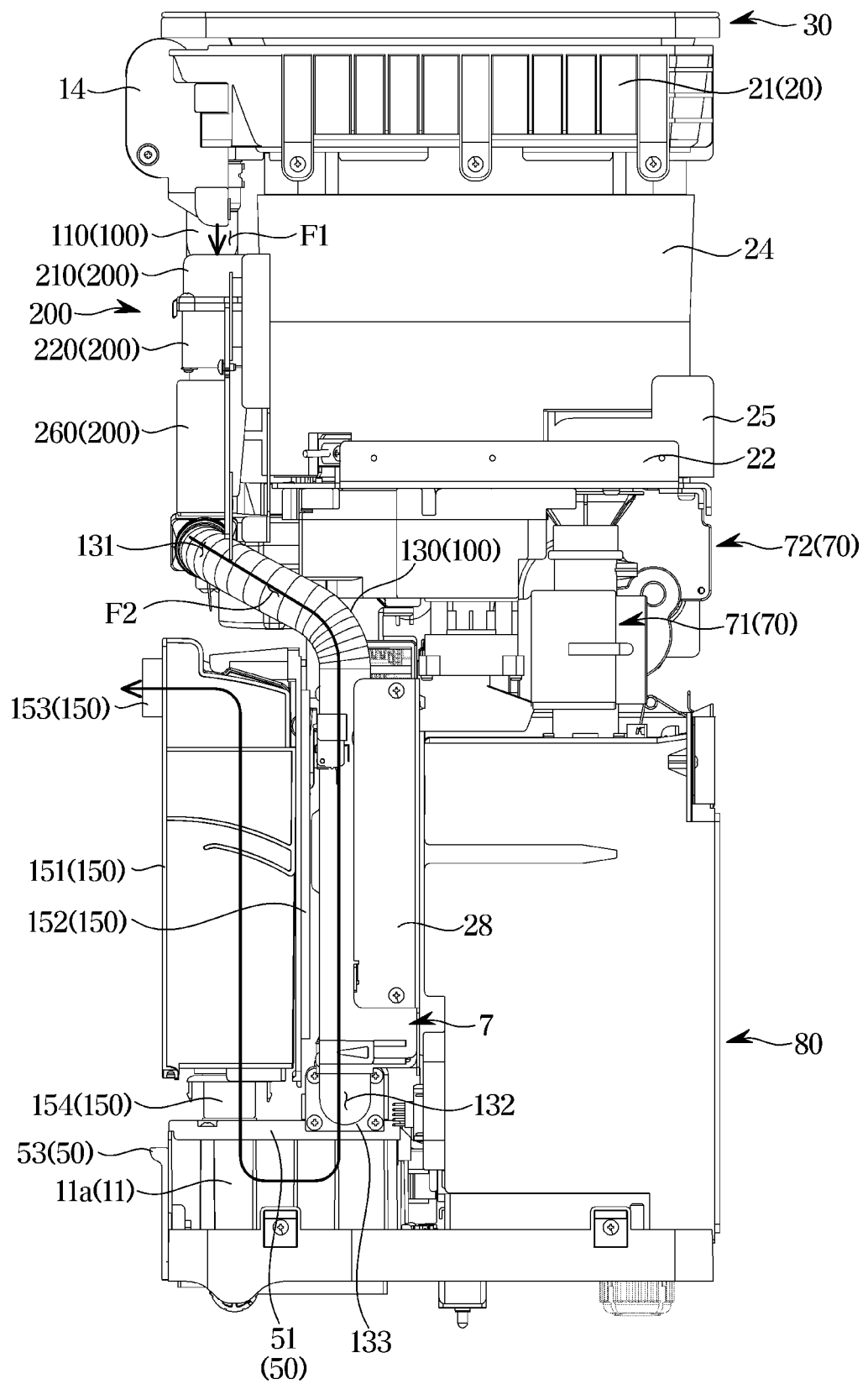
FIG. 10 is a side view illustrating an air flow path of a food waste disposer according to an embodiment of the present disclosure.

FIG. 8 is a rear view illustrating an air flow path during a sterilization operation of a food waste disposer according to an embodiment of the present disclosure. FIG. 9 is a rear view illustrating an air flow path a food waste treatment operation of a food waste disposer according to an embodiment of the present disclosure. FIG. 10 is a side view illustrating an air flow path of a food waste disposer according to an embodiment of the present disclosure.

The overall air flow in a state, in which the sterilization process of the disclosure is performed, and in a state, in which the food waste treatment process is performed, will be described with reference to FIGS. 8 to 10.

Referring to FIGS. 8 and 10, the first exhaust pipe 110 may form a first exhaust flow path F1. The first exhaust pipe 110 may be connected to the branch pipe 120 and the exhaust fan 140 to form an upstream portion of the exhaust flow path formed by the exhaust fan 140.

The first exhaust pipe 110 may include the first inlet 111 and a first outlet 112. As described above, the first inlet 111 may be provided to communicate with the guide flow path G and the communication space 21dd when the cover device 30 closes the upper portion of the housing 10. Air inside the grinding device 40 may flow into the first exhaust pipe 110 through the first inlet 111.

The first outlet 112 may be provided to communicate with the exhaust fan case 142. The first outlet 112 may be provided to allow air, which is introduced into the first exhaust pipe 110 through the first inlet 111, to flow out to the exhaust fan 140.

The first exhaust flow path F1 may be formed between the first inlet 111 and the first outlet 112.

The first exhaust flow path F1 may communicate with the guide flow path G in a state in which the cover device 30 is closed with respect to the housing 10.

The second exhaust pipe 130 may form the second exhaust flow path F2.

The second exhaust pipe 130 may be connected to the exhaust fan 140 to form a downstream portion of the exhaust flow path formed by the exhaust fan 140.

The second exhaust pipe 130 may include a second inlet 131 and a second outlet 132. The second inlet 131 may be provided to communicate with the exhaust fan case 142. The second inlet 131 may be provided to allow air, which flows through the first exhaust flow path F1, to flow into the second exhaust pipe 130.

The second outlet 132 may be provided to communicate with the water trap 50. The second outlet 132 may be provided to allow air, which is introduced into the second exhaust pipe 130 through the second inlet 131, to flow out into the water trap 50. The second exhaust flow path F2 may be formed between the second inlet 131 and the second outlet 132.

The second exhaust pipe 130 may include the coupling flange 133 coupled to the cover panel 51 of the water trap 50.

The water trap 50 may be arranged between the second exhaust pipe 130 and the filter assembly 150. The water trap 50 may be provided to collect condensed water generated from air flowing through the first exhaust flow path F1 and the second exhaust flow path F2. The cover panel 51 of the water trap 50 may be connected to the second exhaust pipe 130 and the filter assembly 150.

The branch pipe 120 may include a connection portion 121 and a plasma supply portion 122. The connection portion 121 may be connected to the first exhaust pipe 110. The connection portion 121 may be provided between the first inlet 111 of the first exhaust pipe 110 and the second outlet 132.

The plasma supply portion 122 may be connected to the sterilization device 200. Since the first exhaust pipe 110 is connected to the upstream side of the exhaust fan 140, the branch pipe 120 branching from the first exhaust pipe 110 may also be connected to the upstream side of the exhaust fan 140.

The branch pipe 120 may include a connection flow path C formed between the connection portion 121 and the plasma supply portion 122. The first exhaust flow path F1, the connection flow path C, and the second exhaust flow path F2 may be formed in a region behind the grinding device 40.

The sterilization device 200 may suction outside air to generate plasma, and supply the generated plasma to the first exhaust flow path F1 through the connection flow path C of the branch pipe 120. This is referred to as a sterilization process. Detailed configuration of the sterilization device 200 will be described below.

The sterilization process may be performed when the controller detects completion of the food waste treatment process of the grinding device 40.

Whether the food waste treatment process of the grinding device 40 is completed may be detected by measuring the internal temperature of the grinding device 40. When the internal temperature of the grinding device 40 is detected as being higher than a set temperature, the controller may determine that the food waste treatment process is completed. Accordingly, the controller may control the sterilization device 200 to perform the sterilization process. In this case, the controller may control the heating device 60 such that no more heat is supplied to the grinding device 40.

Therefore, the plasma generated from the sterilization device 200 in the sterilization process may flow to the first exhaust pipe 110 through the branch pipe 120. In this case, the controller may control the sterilization device 200 to open the connection flow path C such that plasma is supplied to the first exhaust pipe 110.

In other words, the branch pipe 120 may be provided to form a connection flow path C along which plasma generated from the sterilizing device 200 is supplied toward the first exhaust pipe 110 when the food waste treatment process of the grinder 40 is completed.

Air flow through the connection flow path C may be formed by the exhaust fan 140 connected to the first exhaust pipe 110. Plasma introduced into the exhaust fan 140 may flow to the second exhaust pipe 130. The plasma flowing into the second exhaust pipe 130 may pass through the inner space of the water trap 50 and then through a filter connection portion 154, reach the filter assembly 150.

Therefore, in the sterilization process, plasma may be supplied to the inside of the first exhaust pipe 110, the exhaust fan 140, and the second exhaust pipe 130 connected to the branch pipe 120, so that each part may be sterilized.

In addition, as plasma is supplied to the filter assembly 150, the filter is regenerated, and the life of the filter assembly 150 may be extended.

Referring to FIGS. 9 and 10, in a food waste treatment process, the controller may control the sterilization device 200 such that the sterilization device 200 closes the connection flow path C.

In a food waste treatment process, the air inside the grinding device 40 is introduced into the first exhaust pipe 110 through the first inlet 111, flows along the first exhaust flow path F1, and flows to the exhaust fan 140 through the first outlet 112.

Thereafter, the air flows into the second exhaust pipe 130 through the second inlet 131, flows along the second exhaust flow path F2, and flows into the water trap 50 through the second outlet 132. The air flowing into the water trap 50 may flow to the filter assembly 150 through the filter connector 154 to remove contaminants, and then be discharged to the outside through the filter discharge portion 153.

As the sterilization device 200 closes the connection flow path C, air containing contaminants introduced from the grinding device 40 may be prevented from being reversely introduced into the sterilization device 200.

In addition, such an air flow may be formed even when the food waste treatment process is not performed. For example, the exhaust fan 140 may operate even when the process of grinding, stirring, and drying the food waste is not performed in the grinding device 40.

Therefore, it is possible to filter odors that may occur in any situation in the food waste disposer, and to discharge the filtered air.

Figure 11:
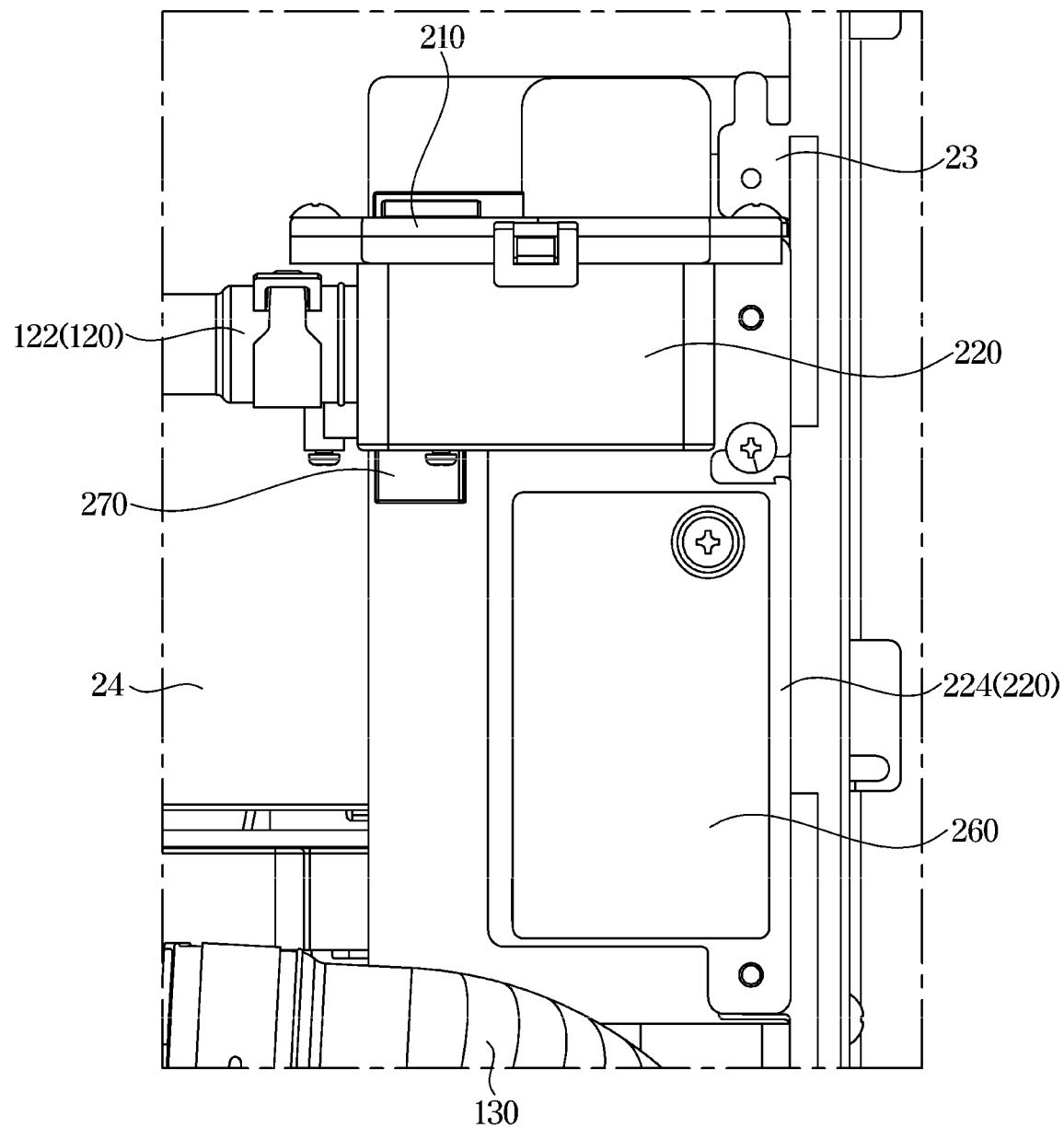
FIG. 11 is an enlarged view of part B of FIG. 8, which shows a sterilization device for a food waste disposer according to an embodiment of the present disclosure.
Figure 12:
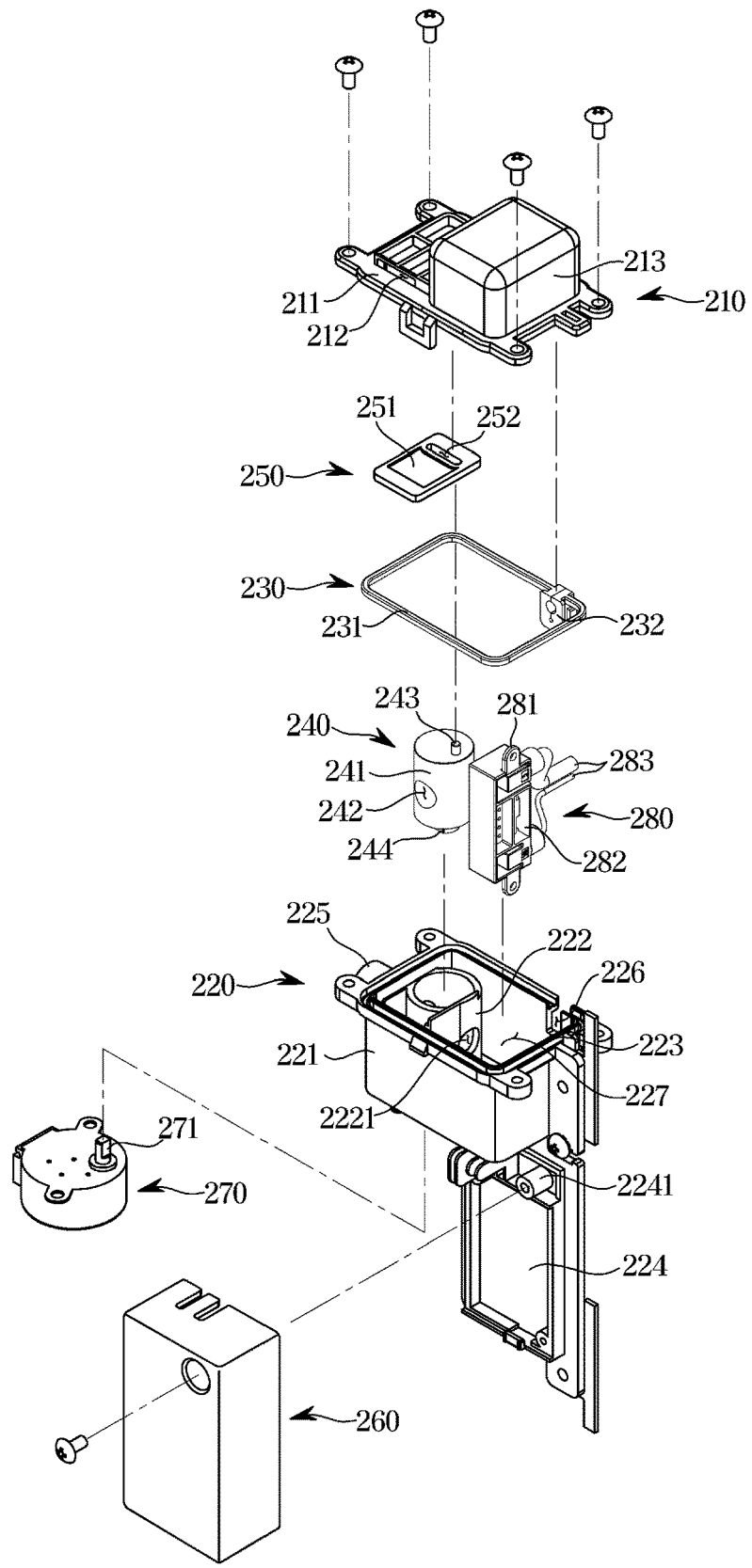
FIG. 12 is an exploded view illustrating a sterilization device of a food waste disposer according to an embodiment of the present disclosure.
Figure 13:
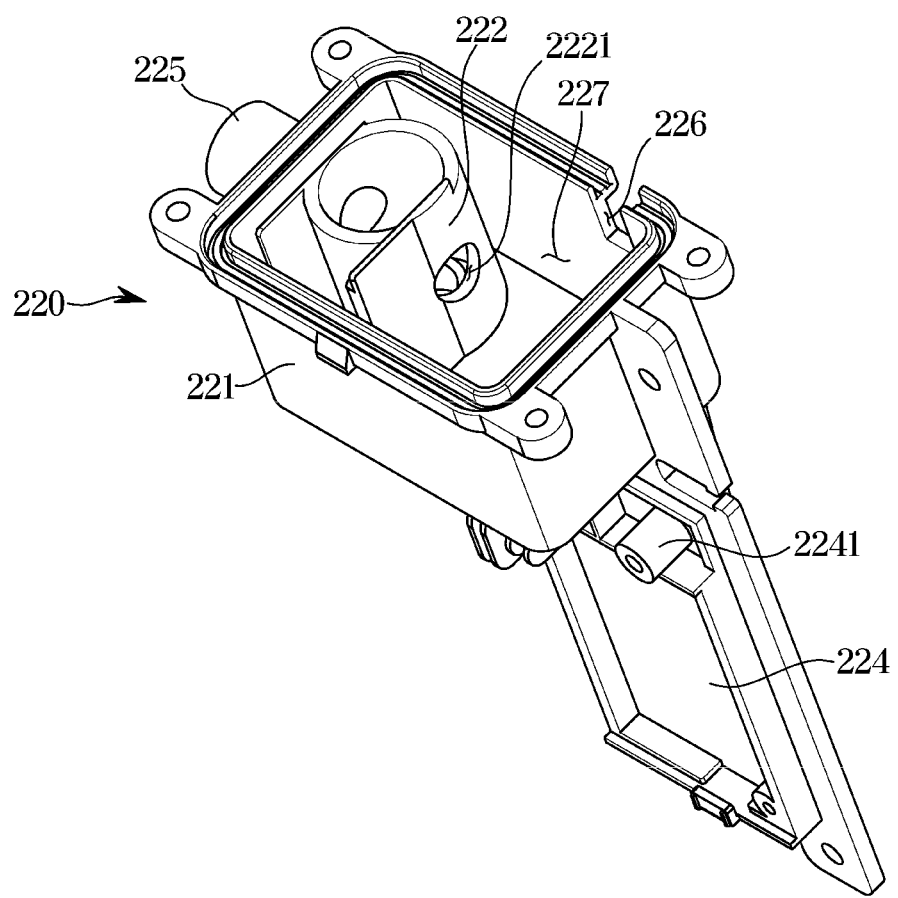
FIG. 13 is a view illustrating a second case shown in FIG. 12, which is viewed from above.
Figure 14:
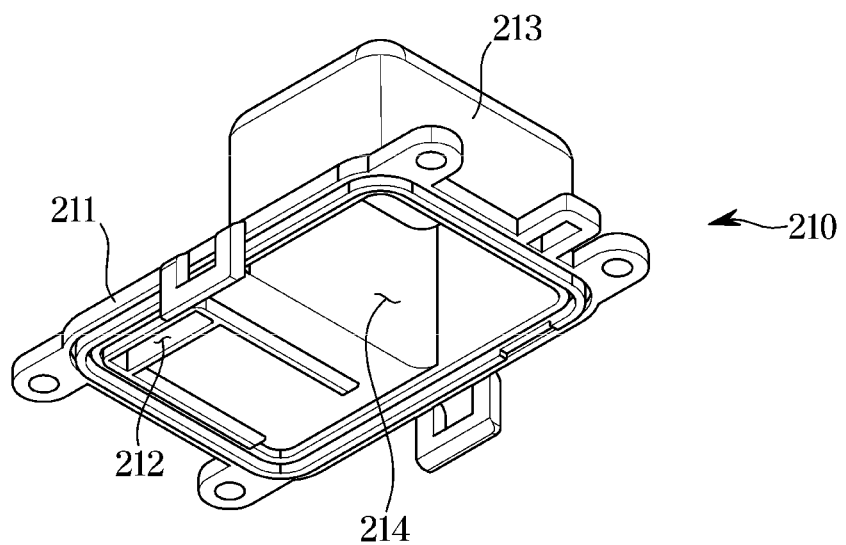
FIG. 14 is a view illustrating a first case shown in FIG. 12, which is viewed from below.

FIG. 11 is an enlarged view of part B of FIG. 8, which shows a sterilization device for a food waste disposer according to an embodiment of the present disclosure. FIG. 12 is an exploded view illustrating a sterilization device of a food waste disposer according to an embodiment of the present disclosure. FIG. 13 is a top view illustrating a second case shown in FIG. 12. FIG. 14 is a bottom view illustrating a first case shown in FIG. 12.

Referring to FIGS. 11 to 14, the sterilization device 200 may include a first case 210 and a second case 220.

The first case 210 may include a first body 211, an outside air inlet 212 and an extension portion 213.

The outside air inlet 212 may be formed on an upper surface of the first body 211. The outside air inlet 212 may be formed by a portion of the first body 211 that is open such that air inside the first case 210 communicates with air outside the first case 210.

The outside air inlet 212 may be formed to be open such that air outside the first case 210 is introduced into the first case 210. Outside air may be supplied to the sterilization device 200 in such a way that outside air is introduced into the outside air inlet 212 due to an assembly tolerance between the housings 10 of the food waste disposer 1.

However, the method of supplying outside air through the outside air inlet 212 is not limited thereto. For example, the food waste disposer 1 may include an outside air inlet hole 361 formed in the housing 10 at a position corresponding to the outside air inlet 212.

The extension portion 213 may extend upward from the first body 211. A first plasma generating space 214 may be formed inside the first case 210. For example, the first plasma generating space 214 may be formed inside the extension portion 213.

The second case 220 may include a second body 221, a partition 222, a branch pipe mounting portion 225, and a second plasma generating space 227. The second case 220 may be coupled to the branch pipe 120. The second case 220 may be vertically coupled to the first case 210.

The partition 222 may be formed inside the second body 221. The partition portion 222 may be provided to accommodate a first opening and closing member 240. The first opening and closing member 240 may be accommodated at one side of the partition 222, and the second plasma generating space 227 may be formed at the other side opposite to the one side of the partition 222. An opening hole 2221 may be formed in the partition 222 to communicate with a flow hole 242 of the first opening and closing member 240. The first opening and closing member 240 may be provided to open or close the opening hole 2221 of the partition 222.

The branch pipe mounting portion 225 may extend to the outside of the second body 221. The branch pipe mounting portion 225 may extend toward the branch pipe 120 from the second body 221 so as to be connected to the branch pipe 120. The branch pipe mounting portion 225 may be inserted into the branch pipe 120. More specifically, the branch pipe mounting portion 225 may be connected to the plasma supply portion 122 of the branch pipe 120. The branch pipe mounting portion 225 may be provided to communicate with the inner space of the second case 220.

The second plasma generating space 227 may be formed inside the second case 220. The second plasma generating space 227 may be formed at a position corresponding to the first plasma generating space 214.

The second case 220 may include a sealing accommodating portion 223 and an incision portion 226.

The sealing accommodating portion 223 may be provided to accommodate a part of a case sealing member 230. The sealing accommodating portion 223 may be formed as a recess in a portion of the upper surface of the second case 220. The sealing accommodating portion 223 may be formed along the edge of the second case 220.

The incision portion 226 may be formed as a cut in a part of the rear surface of the second case 220. An electrode passage portion 232 of the case sealing member 230 may be mounted on the second case 220 through the incision portion 226.

The second case 220 may include a substrate mounting portion 224.

The substrate mounting portion 224 may extend downward from the second case 220. The substrate mounting portion 224 may be formed lengthways downward from the rear surface of the second case 220 to have a plate shape.

The substrate mounting portion 224 may be provided to allow a high voltage generating portion 260 to be coupled thereto. The substrate mounting portion 224 may include a coupling boss 2241 to which the high voltage generating portion 260 is coupled.

The sterilization device 200 may include the case sealing member 230.

The case sealing member 230 may be provided to seal between the first case 210 and the second case 220. The case sealing member 230 blocks the first plasma generating space 214 and the second plasma generating space 227 from the outside, thereby increasing the plasma generating precision of the sterilization device 200.

The case sealing member 230 may include a sealing portion 231 accommodated in the sealing accommodating portion 223 of the second case 220. The sealing portion 231 may be provided in a ring shape and accommodated on the upper surface of the second case 220.

The case sealing member 230 may include the electrode passage portion 232 connected to one side of the sealing portion 231. The electrode passage portion 232 may be accommodated in the incision portion 226 of the second case 220. The electrode passage portion 232 may be provided to allow an electrode portion 283 of a plasma generator 280 to pass therethrough and connected to the high voltage generating portion 260.

The sterilization device 200 may include the high voltage generating portion 260 and the plasma generator 280.

The high voltage generating portion 260 may be provided to generate a high voltage required for plasma generation. The plasma generator 280 may be connected to the high voltage generating portion 260 to generate plasma.

The high voltage generating portion 260 may be mounted on the substrate mounting portion 224 of the second case 220.

The plasma generator 280 may include an electrode accommodating case 282 in which an electrode for discharge is accommodated.

The plasma generator 280 may include case mounting portions 281 formed at both ends of the electrode accommodating case 282 for the plasma generator 280 to be coupled to the inside of the second case 220.

The plasma generator 280 may include an electrode portion 283 provided to connect the electrode to the high voltage generating portion 260. The electrode portion 283 may pass through the electrode passage portion 232 of the case sealing member 230 so as to be connected to the high voltage generating portion 260 at the outside of the second case 220.

The sterilization device 200 may include a driver 270, a first opening and closing member 240, and a second opening and closing member 250.

Specifically, the sterilization device 200 may include the opening and closing members 240 and 250 movably provided inside the first case 210 and the second case 220 to open the connection flow path C when the food waste treatment process of the grinding device 40 is completed, to thereby supply plasma to the exhaust pipe The driver 270 may be coupled to a lower portion of the second case 220 to generate power. The driver 270 may include a driving shaft 271 extending upward to transmit power to the first opening and closing member 240.

The first opening and closing member 240 and the second opening and closing member 250 may be movably disposed inside the case to open or close the connection flow path C by being connected to the driver 270.

The first opening and closing member 240 may be disposed between the branch pipe mounting portion 225 and the plasma generating space to open or close an end of the branch pipe mounting portion 225.

The first opening and closing member 240 may include a first sealing body 241, a flow hole 242, a guide protrusion 243 and a power transmission portion 244.

The first sealing body 241 may be disposed in the partition 222. The flow hole 242 may be formed by an opening in a part of the first sealing body 241. The first sealing body 241 and the flow hole 242 may be provided to open or close the opening hole 2221 of the partition 222 and the end of the branch pipe mounting portion 225.

The guide protrusion 243 may extend from the first sealing body 241 toward the second opening and closing member 250. The guide protrusion 243 may extend upward from the upper surface of the first sealing body 241.

The guide protrusion 243 may be formed at a position spaced a predetermined distance from the center of rotation of the first sealing body 241 to change in position according to the rotation of the first opening and closing member 240.

The power transmission portion 244 may be formed on the lower side of the first sealing body 241 and connected to the driver 270. Power of the driver 270 may be transmitted to the first opening and closing member 240 through the power transmission portion 244.

The second opening and closing member 250 may be connected to the first opening and closing member 240 to open or close the outside air inlet 212 of the first case 210.

The second opening and closing member 250 may include a second sealing body 251 and a protrusion insertion portion 252.

The second sealing body 251 may be provided to be movable inside the first case 210 and the second case 220 so as to cover the upper portion of the partition 222 of the second case 220. The second sealing body 251 may be movably provided to open or close the outside air inlet 212 of the first case 210.

The protrusion insertion portion 252 may be formed by an opening in a portion of the second sealing body 251. The protrusion inserting portion 252 may be provided to allow the guide protrusion 243 of the first opening and closing member 240 to be inserted thereinto.

Hereinafter, the operation of the sterilization device 200 will be described in detail.

Figure 15:
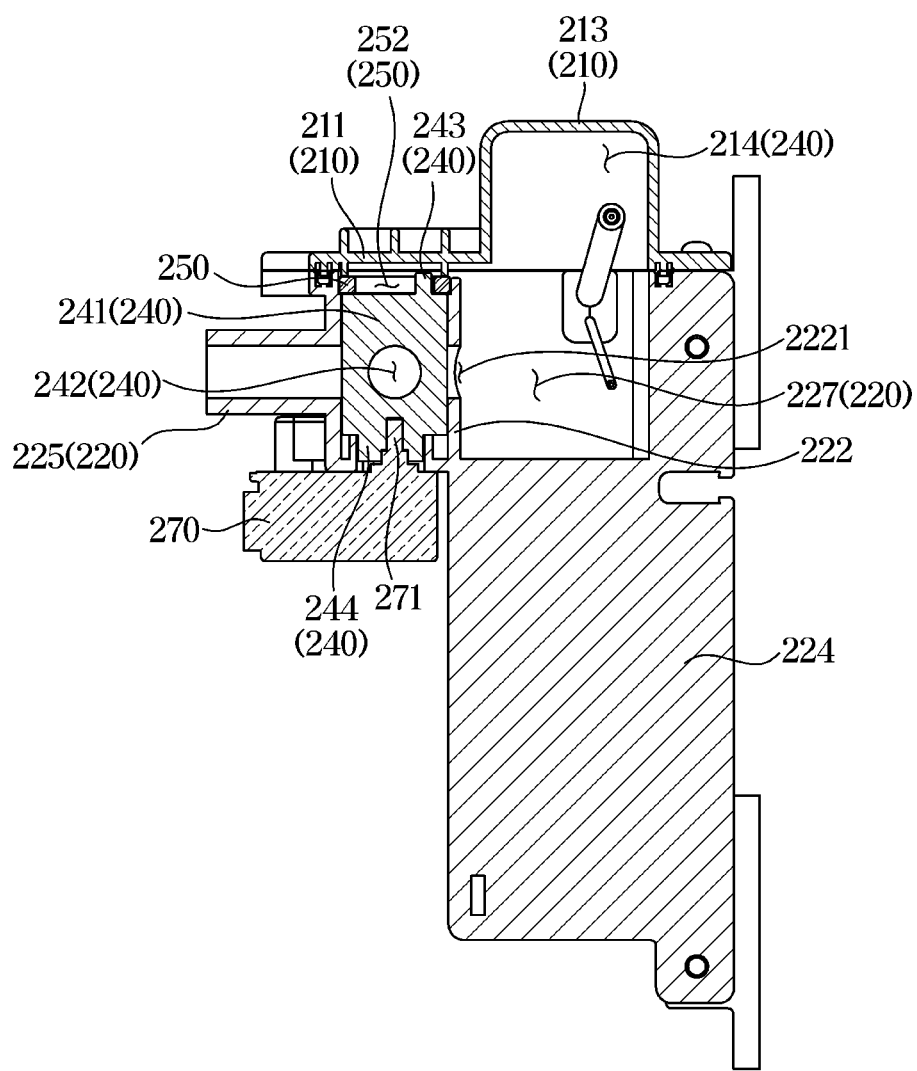
FIG. 15 is a cross-sectional view illustrating a sterilization device when a food waste disposer does not perform a sterilization operation according to an embodiment of the present disclosure.
Figure 16:
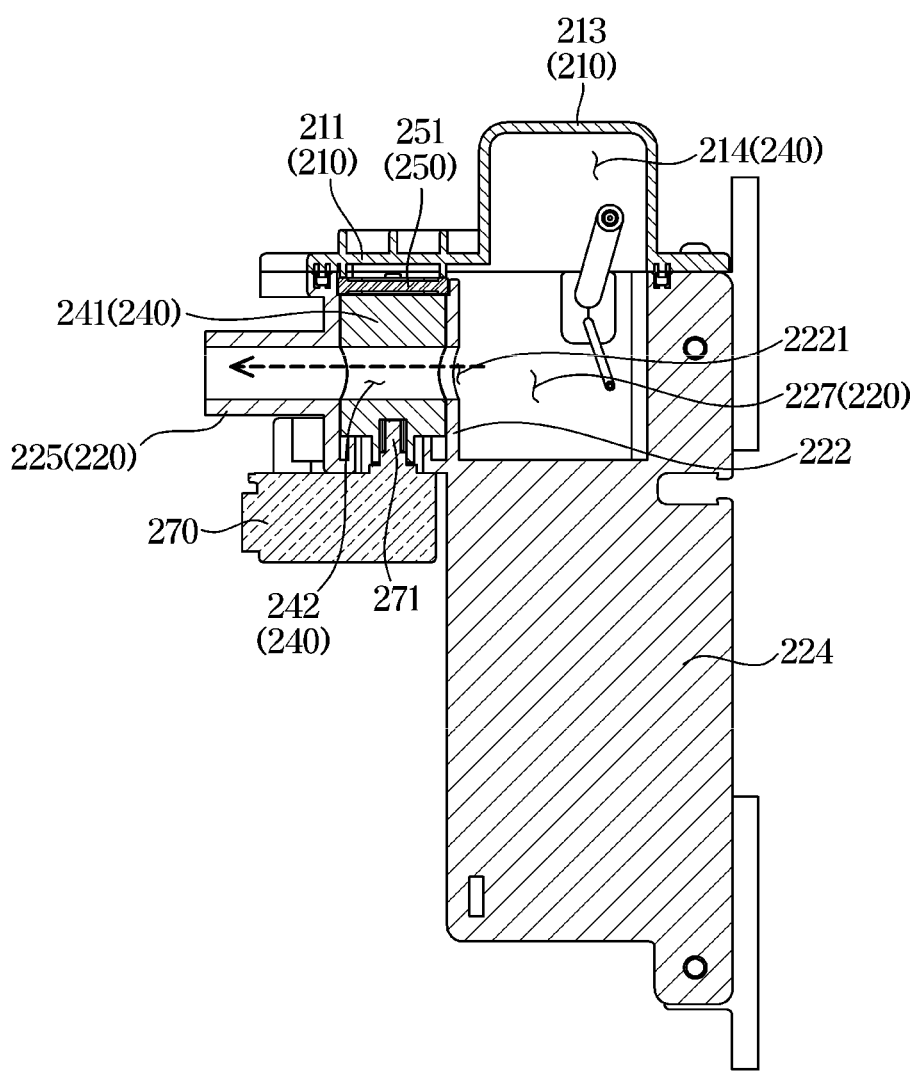
FIG. 16 is a cross-sectional view illustrating a sterilization device when a food waste disposer according to an embodiment of the present disclosure performs a sterilization operation.
Figure 17:
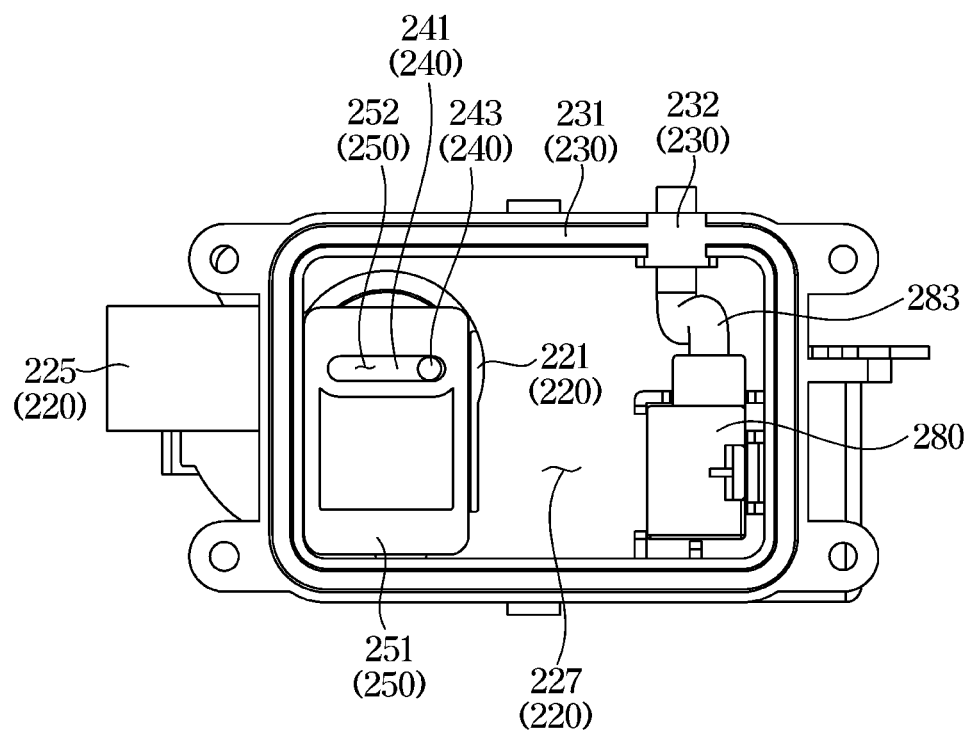
FIG. 17 is a top view illustrating a sterilization device when a food waste disposer according to an embodiment of the present disclosure does not perform a sterilization process.
Figure 18:
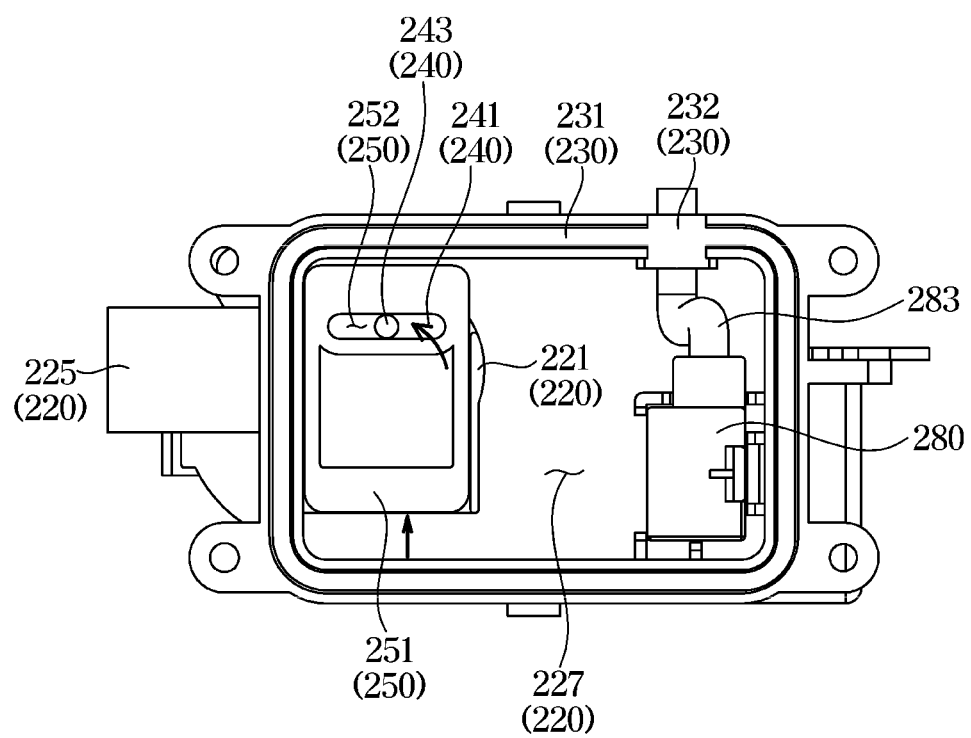
FIG. 18 is a top view illustrating a sterilization device when a food waste disposer according to an embodiment of the present disclosure performs a sterilization process.

FIG. 15 is a cross-sectional view illustrating a sterilization device when a food waste disposer does not perform a sterilization operation according to an embodiment of the present disclosure. FIG. 16 is a cross-sectional view illustrating a sterilization device when a food waste disposer according to an embodiment of the present disclosure performs a sterilization operation. FIG. 17 is a top view illustrating a sterilization device when a food waste disposer according to an embodiment of the present disclosure does not perform a sterilization process. FIG. 18 is a top view illustrating a sterilization device when a food waste disposer according to an embodiment of the present disclosure performs a sterilization process.

Referring to FIGS. 15 and 17, the controller may not perform the sterilization process when the food treatment process of the grinding device 40 is in progress. In other words, the controller may control the sterilization device 200 such that the sterilization device 200 closes the connection flow path C. In FIG. 17, the sterilization device 200 is viewed from the top by omitting the first case 210 of the sterilization device 200 for the sake of convenience of description.

Specifically, as shown in FIG. 15, the first opening and closing member 240 of the sterilization device 200 may be coupled to the driving shaft 271 of the driver 270 and receive power from the driver 270 to rotate.

When the sterilization process is not performed, the first opening and closing member 240 may be located in a position closing the end of the branch pipe mounting portion 225 and the opening hole 2221 of the partition portion 222. For example, the first opening and closing member 240 may be rotated to a position in which an area between the branch pipe mounting portion 225 and the opening hole 2221 of the partition 222 is closed by the first sealing body 241.

Therefore, the plasma generating spaces 214 and 227 of the sterilization device 200 may be caused not to be in communication with the connection flow path C of the branch pipe 120 by the first opening and closing member 240. That is, since the sterilization device 200 and the first exhaust pipe 110 do not communicate with each other, the sterilization device 200 is not affected by the intake airflow by the exhaust fan 140.

In this case, as shown in FIG. 17, the second opening and closing member 250 connected to the first opening and closing member 240 may be caused to close the outside air inlet 212 by the guide protrusion 243 of the first opening and closing member 240. For example, the second opening and closing member 250 may be disposed at a position in which the outside air inlet 212 is closed by the second sealing body 251.

The second opening and closing member 250 may move forward and backward with respect to the first case 210 and the second case 220 based on the rotational movement of the first opening and closing member 240. For example, as the guide protrusion 243 of the first opening and closing member 240 is inserted into the protrusion inserting portion 252 of the second opening and closing member 250, the second opening and closing member 250 may be caused to interfere with the first opening and closing member 240.

The outside air inlet 212 may be located on the front upper portion of the first case 210. Accordingly, the second opening and closing member 250 may move to a position covering the outside air inlet 212 formed on the front upper portion of the first case 210 from the lower side of the first case 210.

Therefore, outside air is not supplied into the sterilization device 200, and thus the sterilization device 200 may not generate plasma.

As shown in FIGS. 15 and 17, when the sterilization process is not performed, the outside air inlet 212 of the sterilization device 200 is closed, and the sterilization device 200 does not generate plasma. In this case, the branch pipe mounting portion 225 of the sterilization device 200 communicating with the connection flow path C of the branch pipe 120 is closed, so that the inside of the sterilization device 200 does not communicate with the connection flow path C.

In other words, when the sterilization process is not performed, the sterilization device 200 may not be affected by the air flow formed by the exhaust fan 140 and may not generate plasma.

Referring to FIGS. 16 and 18, the controller may perform a sterilization process when the food treatment process of the grinding device 40 is completed. In other words, the controller may control the sterilization device 200 to open the connection flow path C. In FIG. 18, the sterilization device 200 is viewed from the top by omitting the first case 210 of the sterilization device 200 for the sake of convenience of description.

Specifically, as shown in FIG. 16, the first opening and closing member 240 of the sterilization device 200 may be coupled to the driving shaft 271 of the driver 270 and receive power from the driver 270 to rotate.

When the sterilization process is performed, the first opening and closing member 240 may be located in a position opening the end of the branch pipe mounting portion 225 and the opening hole 2221 of the partition portion 222. For example, the first opening and closing member 240 may be rotated to a position in which an area between the branch pipe mounting portion 225 and the opening hole 2221 of the partition 222 is open due to the flow hole 242.

Therefore, the plasma generating spaces 214 and 227 of the sterilization device 200 may be caused to communicate with the connection flow path C of the branch pipe 120 by the first opening and closing member 240. That is, since the sterilization device 200 and the first exhaust pipe 110 communicate with each other, the sterilization device 200 is affected by the intake airflow by the exhaust fan 140.

In this case, as shown in FIG. 18, the second opening and closing member 250 connected to the first opening and closing member 240 is caused to open the outside air inlet 212 by the guide protrusion 243 of the first opening and closing member 240. For example, the second opening and closing member 250 may be disposed at a position in which the outside air inlet 212 is opened by a movement of the second sealing body 251.

The second opening and closing member 250 may move forward and backward with respect to the first case 210 and the second case 220 based on the rotational movement of the first opening and closing member 240. For example, as the guide protrusion 243 of the first opening and closing member 240 is inserted into the protrusion inserting portion 252 of the second opening and closing member 250, the second opening and closing member 250 may be caused to interfere with the first opening and closing member 240.

The outside air inlet 212 may be located on the front upper portion of the first case 210. Accordingly, the second opening and closing member 250 may move backward to a position in which the outside air inlet 212 formed on the front upper portion of the first case 210 is not covered.

Therefore, outside air may be supplied into the sterilization device 200, and thus the sterilization device 200 may generate plasma.

As shown in FIGS. 16 and 18, when the sterilization process is performed, the outside air inlet 212 of the sterilization device 200 is opened so that the sterilization device 200 may generate plasma. Plasma may be generated by supplying the high voltage generated by the high voltage generating portion 260 to the plasma generator 280 to discharge electrodes and ionize air.

In this case, since the branch pipe mounting portion 225 of the sterilization device 200 communicating with the connection flow path C of the branch pipe 120 is opened, the inside of the sterilization device 200 is caused to communicate with the connection flow path C.

In other words, when the sterilization process is performed, the sterilization device 200 may be affected by the air flow formed by the exhaust fan 140 to thereby admit outside air through the outside air inlet 212 and generate plasma, and may supply the plasma to through the branch pipe 120.

In other words, when the first opening and closing member 240 moves to a position opening the connection flow path C, air may be introduced into the first case 210 from the outside air inlet 212, and the introduced air may be ionized in the plasma generation space and supplied to the branch pipe 120 and the first exhaust pipe 110 through the branch pipe mounting portion 225.

In the food waste disposer according to the disclosure, the filter may be regenerated by connecting the sterilization device 200 to the deodorizing device 100, so that the durability of the filter may be maintained for a long period of time.

In addition, the sterilization device 200 is used not only to regenerate the filter but also to sterilize the exhaust pipe connected to the filter, so that contaminants accumulated in the exhaust pipe may be minimized.

In addition, the branch pipe 120 along which the plasma flows is connected to the upstream side of the exhaust fan 140, so that plasma may be generated and supplied in a more simplified structure.

In addition, the sterilization process is performed only during a set period of time, so that excessive supply and generation of plasma and unneeded power consumption may be prevented.

In addition, when the sterilization process is not performed, the sterilizing device 200 is blocked from communicating with the exhaust flow path, so that air containing contaminants may not flow into the sterilizing device 200.

A sterilizing device is connected to a deodorizing device to regenerate the filter, so that the durability of the filter can be maintained for a long time.

A branch pipe through which plasma flows is connected to an upstream side of an exhaust fan, so that plasma can be supplied in a more simplified structure.

Since a sterilization process is performed only for a set period of time, excessive supply and generation of plasma and unrequired consumption of power can be prevented.

A food waste disposer according to an embodiment of the disclosure may include a housing having an upper side that is open and a grinding device arranged inside the housing to grind food waste. The food waste disposer may include a cover device mounted on a housing to cover the upper side of the housing and having a guide duct guide duct forming a guide path that communicates with the grinding device. The food waste disposer may include an exhaust fan arranged at a rear side of the housing to form an air flow. The food waste disposer may include an exhaust pipe connected to the exhaust fan to form an exhaust flow path that communicates with the guide flow path. The food waste disposer may include a filter assembly connected to the exhaust flow path through the exhaust pipe to adsorb contaminants from the air flowing along the exhaust flow path. The food waste disposer may include a branch pipe branching from the exhaust pipe at an upstream side of the exhaust fan to form a connection flow path that communicates with the exhaust flow path. The food waste disposer may include a sterilization device including a case connected to the branch pipe and an opening and closing member movably provided inside the case to open the connection flow path and supply plasma to the exhaust pipe when a food waste treatment process of the grinding device is completed.

The case may include a branch pipe mounting portion connected to the branch pipe; and an outside air inlet into which air outside the case is introduced.

The opening and closing member may include a first opening and closing member rotatably provided to open or close the branch pipe mounting portion; and a second opening and closing member provided to open or close the outside air inlet based on movement of the first opening and closing member.

A food waste disposer according to an embodiment of the disclosure may include a housing. The food waste disposer may include a grinding device arranged inside the housing to grind food waste. The food waste disposer may include a cover device mounted on a housing to cover an upper side of the grinding device. The food waste disposer may include a sterilization device arranged at a rear side of the grinding device to generate plasma. The food waste disposer may include an exhaust fan arranged at one side of the grinding device to suction air from the grinding device. The food waste disposer may include a guide flow path formed in the cover device to allow air introduced from the grinding device to flow. The food waste disposer may include an exhaust flow path that communicates with the guide flow path while the cover device is closed with respect to the housing. The food waste disposer may include an exhaust pipe in which the exhaust flow path is formed and which is connected to the exhaust fan. The food waste disposer may include a branch pipe branching from the exhaust pipe at an upstream side of the exhaust fan to be connected to the sterilization device, and forming a connection flow path such that plasma generated from the sterilization device is supplied to the exhaust pipe when a food waste treatment process of the grinding device is completed.

The sterilization device may include a case coupled to the branch pipe; a driver coupled to the case and generating power; and an opening and closing member movably disposed inside the case to open the connection flow path by being connected to the driver when the food waste treatment process of the grinding device is completed.

A specific shape and a specific direction of a refrigerator have been described above with reference to the accompanying drawings, but the present disclosure may be variously modified and changed by those skilled in the art, and the modifications and changes should be interpreted as being included in the scope of the present disclosure.

What is claimed is:

1. A food waste disposer comprising:
    a housing;
    a grinding device inside the housing to grind food waste;
    an exhaust fan inside the housing to form an air flow;
    an exhaust pipe connected to the exhaust fan to form an exhaust flow path along which air introduced from the grinding device flows via the air flow formed by the exhaust fan;
    a filter assembly to adsorb contaminants from the air flowing along the exhaust flow path;
    a branch pipe branching from the exhaust pipe between the grinding device and the exhaust fan to form a connection flow path that communicates with the exhaust flow path; and
    a sterilization device connected to the branch pipe and configured to:
        selectively open and close the connection flow path, and,
        with the connection flow path being open, generate and supply plasma to the exhaust pipe through the connection flow path via an intake airflow formed by the exhaust fan.

2. The food waste disposer of claim 1, wherein the sterilization device includes:
    a case coupled to the branch pipe,
    a driver coupled to the case and configured to generate power, and
    an opening and closing member inside the case, connected to the driver, and configured to be movable to open and close the connection flow path.

3. The food waste disposer of claim 2, wherein the case includes:
    a branch pipe mounting portion extending toward the branch pipe to be connected to the branch pipe,
    a plasma generating space formed inside the case, and
    an outside air inlet configured so that air outside the case is introduced into the case while the outside air inlet is open.

4. The food waste disposer of claim 3, wherein the opening and closing member includes:
    a first opening and closing member arranged between the branch pipe mounting portion and the plasma generating space to open and close an end of the branch pipe mounting portion, and
    a second opening and closing member connected to the first opening and closing member to open and close the outside air inlet.

5. The food waste disposer of claim 4, wherein the first opening and closing member includes:
    a guide protrusion extending toward the second opening and closing member, and
    the second opening and closing member includes:
    a protrusion insertion portion into which the guide protrusion is inserted.

6. The food waste disposer of claim 5, wherein the first opening and closing member is coupled to the driver to be rotatable with respect to the case, and
    the second opening and closing member interferes with the guide protrusion so as to move back and forth with respect to the case based on rotational movement of the first opening and closing member.

7. The food waste disposer of claim 3, wherein with the opening and closing member in a position opening the connection flow path,
    air is introduced into the case from the outside air inlet, and
    the air introduced into the case is ionized in the plasma generating space and is supplied to the branch pipe through the branch pipe mounting portion.

8. The food waste disposer of claim 1, wherein the exhaust pipe includes:

a first exhaust pipe connected to the branch pipe and the exhaust fan to form an upstream portion of the exhaust flow path; and a second exhaust pipe connected to the exhaust fan to form a downstream portion of the exhaust flow path.

9. The food waste disposer of claim 8, further comprising:

a water trap arranged between the second exhaust pipe and the filter assembly and configured to collect condensed water generated from the air flowing along the exhaust flow path.

10. The food waste disposer of claim 1, further comprising:

a controller configured to control the sterilization device, wherein the controller is configured to, after a food waste treatment process of the grinding device is completed, control the sterilization device to open the connection flow path to perform a sterilization process of supplying plasma to the exhaust pipe.

11. The food waste disposer of claim 1, further comprising:

a cover device mounted on the housing to open or close an upper surface of the housing, and having a guide duct forming a guide flow path through which the air introduced from the grinding device flows with the cover device being in a position to close the upper surface of the housing and the air flow being formed by the exhaust fan.

12. The food waste disposer of claim 11, further comprising:

an accommodating frame arranged between the housing and the grinding device to cover an outside of the grinding device, and having an exhaust portion in communication with the guide flow path and the exhaust flow path; and a blocking member configured to open and close the exhaust portion.

13. The food waste disposer of claim 12, wherein the cover device further includes a connecting duct coupled to a rear end of the guide duct to connect the guide duct and the exhaust portion, and the connecting duct includes a pusher formed to extend and configured to, with the cover device being in the position to close the upper surface of the housing, press the blocking member so as to open the exhaust portion.

14. The food waste disposer of claim 1, wherein the exhaust flow path and the connection flow path are formed in a region behind the grinding device.

15. The food waste disposer of claim 1, further comprising:

a storage device disposed on a front lower side of the grinding device to store food waste treated by the grinding device.

* * * * *